(12) United States Patent
Gray

(10) Patent No.: US 8,711,121 B2
(45) Date of Patent: Apr. 29, 2014

(54) ARCHITECTURE AND METHOD FOR MULTI-ASPECT TOUCHSCREEN SCANNING

(75) Inventor: Patrick T. Gray, Cedar Park, TX (US)

(73) Assignee: Wacom Co., Ltd., Tokyo (JP)

( * ) Notice: Subject to any disclaimer, the term of this patent is extended or adjusted under 35 U.S.C. 154(b) by 1295 days.

(21) Appl. No.: 12/333,473

(22) Filed: Dec. 12, 2008

(65) Prior Publication Data

US 2010/0149110 A1    Jun. 17, 2010

(51) Int. Cl.
| G06F 3/045 | (2006.01) |
| G06F 3/041 | (2006.01) |
| G06K 11/06 | (2006.01) |
| G08C 21/00 | (2006.01) |

(52) U.S. Cl.
USPC .................. 345/174; 345/173; 178/18.01

(58) Field of Classification Search
CPC ......... G06F 3/041; G06F 3/044; G06F 3/045; G06F 3/047; G06F 2203/04106
USPC ................................. 345/173–178
See application file for complete search history.

(56) References Cited

U.S. PATENT DOCUMENTS

| | | |
|---|---|---|
| 3,921,167 A | 11/1975 | Fox |
| 3,971,013 A | 7/1976 | Challoner et al. |
| 4,125,783 A | 11/1978 | Sefton |
| 4,157,539 A | 6/1979 | Hunts et al. |
| 4,221,975 A | 9/1980 | Ledniczki et al. |
| 4,237,421 A | 12/1980 | Waldon |
| 4,264,903 A | 4/1981 | Bigelow |
| 4,288,786 A | 9/1981 | Ledniczki et al. |
| 4,290,052 A | 9/1981 | Eichelberger et al. |
| 4,293,987 A | 10/1981 | Gottbreht et al. |
| 4,367,385 A | 1/1983 | Frame |
| 4,394,643 A | 7/1983 | Williams |
| 4,405,918 A | 9/1983 | Wall et al. |
| 4,413,252 A | 11/1983 | Tyler et al. |
| 4,550,221 A | 10/1985 | Mabusth |
| 4,561,002 A | 12/1985 | Chin |

(Continued)

FOREIGN PATENT DOCUMENTS

| | | |
|---|---|---|
| CN | 1945516 A | 4/2007 |
| JP | 11-194893 | 7/1999 |
| JP | 2007-533044 A | 11/2007 |
| WO | 2005114369 A2 | 1/2005 |

OTHER PUBLICATIONS

European Search Report for EP Application No./Patent No. 09015384.2224/2196889, dated Apr. 26, 2011.

*Primary Examiner* — Sumati Lefkowitz
*Assistant Examiner* — David Tung
(74) *Attorney, Agent, or Firm* — Garlick & Markison; Holly L. Rudnick

(57) ABSTRACT

Architecture and method for multi-aspect touchscreen scanning. This architectures employs a single type of circuitry capable to perform both signal generation and signal detection for performing both zone scanning and cross point within a touchscreen to identify a user's interaction with the touchscreen and to discriminate actual touch locations on the touchscreen (including multiple, concurrent user touch locations on the touchscreen). This signal generation/detection circuitry can be implemented multiple times within the architecture (e.g., one for providing/detecting signals of conductors aligned in a first direction across the touchscreen, and another for providing/detecting signals of conductors aligned in a second direction across the touchscreen). Moreover, a combination of both zone scanning and cross point within the touchscreen allows for a very accurate discrimination between false/phantom touch locations and actual/real touch locations made by a user interacting with the touchscreen.

27 Claims, 23 Drawing Sheets

(56) References Cited

U.S. PATENT DOCUMENTS

| | | |
|---|---|---|
| 4,639,720 A | 1/1987 | Rympalski et al. |
| 4,728,931 A | 3/1988 | Linder et al. |
| 4,743,895 A | 5/1988 | Alexander |
| 5,078,220 A | 1/1992 | Briefer |
| 5,087,825 A | 2/1992 | Ingraham |
| 5,153,572 A | 10/1992 | Caldwell et al. |
| 5,189,417 A | 2/1993 | Caldwell et al. |
| 5,305,017 A | 4/1994 | Gerpheide |
| 5,508,700 A | 4/1996 | Taylor et al. |
| 5,526,294 A | 6/1996 | Ono et al. |
| 5,565,658 A | 10/1996 | Gerpheide et al. |
| 5,572,205 A | 11/1996 | Caldwell et al. |
| 5,760,715 A | 6/1998 | Senk et al. |
| 5,933,102 A | 8/1999 | Miller et al. |
| 5,945,980 A | 8/1999 | Moissev et al. |
| 6,051,981 A * | 4/2000 | Gershenfeld et al. ......... 324/663 |
| 6,188,391 B1 | 2/2001 | Seely et al. |
| 6,239,788 B1 | 5/2001 | Nohno et al. |
| 6,825,833 B2 * | 11/2004 | Mulligan et al. ............... 345/174 |
| 2008/0088594 A1 * | 4/2008 | Liu et al. ...................... 345/173 |
| 2008/0158167 A1 * | 7/2008 | Hotelling et al. ............. 345/173 |

* cited by examiner

ARCHITECTURE AND METHOD FOR MULTI-ASPECT TOUCHSCREEN SCANNING

BACKGROUND OF THE INVENTION

1. Technical Field of the Invention

The invention relates generally to devices that include a man to machine interface (MMI) implemented using a touchscreen; and, more particularly, it relates to systems and methods for discriminating a user's interaction with such touchscreens.

2. Description of Related Art

Touchscreen technology is relatively new in the world of displays for stationary and mobile devices. Traditionally, an underlying layer of lines that can sense a user's touch are arranged in a patterned manner and are monitored iteratively for a signal that suggests a coordinate of a point that is touched. Initial systems were designed to detect a single touch. A new emphasis, however, is to develop touchscreen technology that can accurately detect multiple simultaneous touches. Some current technology for multi-finger touch works by charging and discharging a voltage on a row or column of a conductor and measuring a change in the charge when touched.

In discriminating between actual/real touch locations and false/phantom touch locations (e.g., a detected signal that does not correspond by an actual user's touch) made by a user interacting with the touchscreen, the prior art does not provide an adequate solution. Moreover, those prior art solutions that do in fact try to address discriminating between false/phantom touch locations and actual/real touch locations oftentimes have a relatively significant amount of provisioned hardware components to try to address such issues. Clearly, certain design considerations within touchscreens and touchscreen systems include efforts to reduce costs, complexity, size, etc. The prior art simply fails to provide an adequate and cost-effective solution to these many issues.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
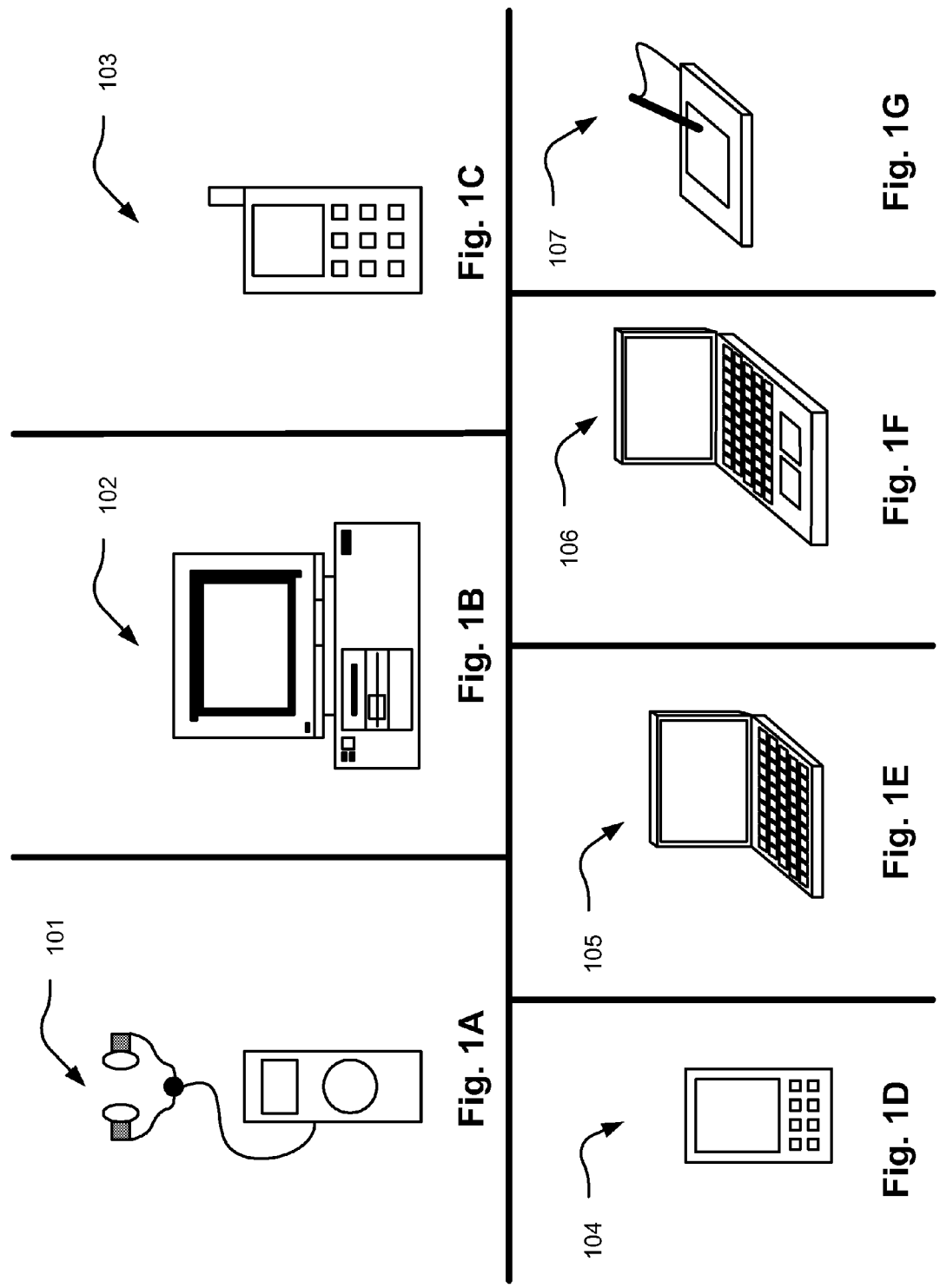
FIG. 1A illustrates an embodiment of a handheld media unit.
FIG. 1B illustrates an embodiment of a computer.
FIG. 1C illustrates an embodiment of a wireless communication device.
FIG. 1D illustrates an embodiment of a personal digital assistant (PDA).
FIG. 1E illustrates an embodiment of a laptop computer.
FIG. 1F illustrates an embodiment of a laptop computer with an integrated touchscreen (e.g., a tablet) on the palm rest.
FIG. 1G illustrates an embodiment of an electronic tablet.

Devices that include some form of man to machine interface (MMI) are employed in a wide variety of contexts. There are varieties of types of MMIs that allow a user to provide information to and retrieve information from a device (e.g., keyboard of a device such as a computer, an interactive panel/touchscreen on any number of devices such as a self-service gas pump, a self-service check in terminal at an airport, etc.). Some MMIs that are implemented using touchscreens in which a user interacts with the touchscreen using a finger or some other implement (e.g., a stylus or other means by which a location on the touchscreen is selected by the user) are increasing in their prevalence. Any of a wide variety of devices may include a MMI having at least a portion of which is implemented with a touchscreen.

In such a touchscreen, a conductive pattern (that includes multiple conductors) is implemented within at least one layer of a touchscreen. The conductive pattern may be implemented using indium tin oxide (ITO) as may be deposited on a substrate composed of polyester or some other appropriate material.

In one embodiment, a plurality of first conductors is axially aligned in a first direction across the touchscreen, and a plurality of second conductors is aligned in a second direction across the touchscreen. The first and second conductors may be implemented to be orthogonal to one another (e.g., first conductors in rows, and second conductors in columns, or vice versa), or some other arrangement may be employed (e.g., in which they are not orthogonal to one another). These first and second conductors may be disposed or arranged such that they do not directly electrically couple to one another (e.g., using an air gap, a dielectric layer of any type including one that comprises a material such as $SiO_2$, a polymer substrate, a bond material, etc.). They may be disposed on the same plane or layer or they may be disposed on different planes or layers.

To determine a location of a user's interaction with a touchscreen, a signal may be applied to one of the first or second conductors of the conductive pattern. Either that same signal may be monitored to help determine the location of a user's interaction with the touchscreen or a signal received from another conductor of the conductive pattern may be used to help determine the location of a user's interaction. In some embodiments, a combination of these two detection approaches may be employed.

In some embodiments, the first conductors are aligned in the first direction and are disposed on a first layer of a touchscreen (e.g., an upper and/or top layer), and the second conductors are aligned in the second direction and are disposed on a second layer of a touchscreen (e.g., a lower and/or bottom layer). In such an embodiment, the respective spacing between the first conductors may be greater than the respective spacing between the second conductors. This may be achieved by aligning the first conductors apart from one another. It may also be achieved by having holes or windows within at least some of the first conductors to allow the coupling of an energized signal via capacitance to the first conductors at an intersection of at least one of the first conductors and at least one of the second conductors.

In addition, as one of the second conductors is energized or charged (e.g., with a signal), the other of the second conductors may be grounded making the second conductors to serve as an effective electromagnetic interference (EMI) shield limiting injected noise from any of a number of sources (e.g., the system, an LCD backlight, any noise source under and/or behind the touchscreen, etc.) from undesirably affecting the first conductors. This effective solid back-layer of the conductive pattern (e.g., the second conductors) effectively shields the upper layer or layers from noises produced under or behind the touchscreen.

This EMI shield created by the plurality of second conductors on the second or bottom layer or plane may also operate to remove changes in any capacitive coupling due to the flexing of a substrate of the touchscreen (e.g., such as when the touchscreen gets bowed or bent a bit due to some stress such as a user's interaction with the touchscreen). This elimination and/or reduction of such effects can allow for a variety of substrates to be used within a touchscreen. In one instance, it particularly allows for the use of non-rigid materials within a touchscreen. As is known, the rigidity required within many touchscreens prohibits their implementation within certain applications.

FIG. 1A illustrates an embodiment of a handheld unit 101. A handheld media unit 101 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format. Historically, such handheld media units were primarily employed for storage and playback of audio media; however, such a handheld media unit 101 may be employed for storage and playback of virtual any media (e.g., audio media, video media, photographic media, etc.). Moreover, such a handheld media unit 101 may also include other functionality such as integrated communication circuitry for wired and wireless communications.

To allow a user to provide commands to and select certain functions via the touchscreen of the handheld media unit 101, the handheld media unit 101 includes at least one touchscreen. Certain selections on the touchscreen may be made by a user's finger or other bodily portion; alternatively, the handheld media unit 101 may include some user-provided implement (e.g., a stylus or other implement) that the user may employ to provide commands to and select certain functions via the touchscreen of the handheld media unit 101.

FIG. 1B illustrates an embodiment of a computer 102. The computer 102 can be a desktop computer, or an enterprise storage devices such a server, of a host computer that is attached to a storage array such as a redundant array of independent disks (RAID) array, storage router, edge router, storage switch, and/or storage director.

The actual monitor of the computer 102 may have touchscreen capability (or only a portion of the monitor may have touchscreen capability). Alternatively, a peripheral device of the computer 102 (e.g., a keyboard or other peripheral device) may include a touchscreen disposed thereon. A user may provide commands to and select certain functions via the touchscreen of the computer 102. Certain selections on the touchscreen may be made by touching indicated areas of the touchscreen with a user's finger (or other bodily portion), a user-provided implement (e.g., a stylus or other implement), etc., that the user may employ to provide commands to and select certain functions via the touchscreen of the computer 102. Herein, all references to a user touching a touchscreen include all methods for touching the touchscreen.

FIG. 1C illustrates an embodiment of a wireless communication device 103. Wireless communication device 103 is capable of communicating via a wireless network such as a cellular, personal communications service (PCS), general packet radio service (GPRS), global system for mobile communications (GSM), and integrated digital enhanced network (iDEN) or other wireless communications network capable of sending and receiving wireless communications. Further, wireless communication device 103 is capable to communicate via the Internet to access email, download content, access websites, and provide steaming audio and/or video programming. In this fashion, wireless communication device 103 can place and receive calls, text messages such as emails, short message service (SMS) messages, pages and other data messages that can include attachments such as documents, audio files, video files, images, and other graphics.

The wireless communication device 103 includes a touchscreen that allows a user of the communication device 103 to provide commands to and select certain functions of the communication device 103. A user may interact with the touchscreen of communication device 103 touching the touchscreen to provide commands and/or to select certain functions via the touchscreen of communication device 103. For example, a user may touch the touchscreen in a specified location to indicate selection or, alternatively, a user may touch the touchscreen in a specified manner to indicate a specified command (e.g., two rapid taps on the touchscreen).

FIG. 1D illustrates an embodiment of a personal digital assistant (PDA) 104. The PDA 104 includes a touchscreen that allows a user of PDA 104 to provide commands to and select certain functions of the PDA 104. A user may interact with the touchscreen of PDA 104 touching the touchscreen to provide commands and/or to select certain functions via the touchscreen of PDA 104. For example, a user may touch the touchscreen in a specified location to indicate selection or, alternatively, a user may touch the touchscreen in a specified manner to indicate a specified command.

FIG. 1E illustrates an embodiment of a laptop computer 105. The actual monitor of the laptop computer 105 may have touchscreen capability (or only a portion of the monitor may have touchscreen capability). Alternatively, a peripheral device of the laptop computer 105 (e.g., an external keyboard or other peripheral device) may include a touchscreen thereon. A user may provide commands to and select certain functions via the touchscreen of the laptop computer 105. A user may interact with the touchscreen of laptop computer 105 by touching the touchscreen to provide commands and/or to select certain functions via the touchscreen of laptop computer 105. For example, a user may touch the touchscreen in a specified location to indicate selection or, alternatively, a user may touch the touchscreen in a specified manner to indicate a specified command.

FIG. 1F illustrates an embodiment of a laptop computer 106 with an integrated touchscreen (e.g., a tablet) on the palm rest. A user may provide commands to and select certain functions via the integrated touchscreen (e.g., tablet) of the laptop computer 106. A user may interact with the touchscreen of laptop computer 106 by touching the touchscreen to provide commands and/or to select certain functions via the touchscreen of laptop computer 106. For example, a user may touch the touchscreen in a specified location to indicate selection or, alternatively, a user may touch the touchscreen in a specified manner to indicate a specified command via the integrated touchscreen (e.g., tablet) of the laptop computer 106.

FIG. 1G illustrates an embodiment of an electronic tablet 107. The electronic tablet 107 includes a stylus that a user employs to provide commands to and select certain functions of the electronic tablet 107. The electronic tablet 107 may also include capabilities to support integrated computing, data storage, etc. that allow the electronic tablet 107 to operate, at least in some respects, like a computer or laptop computer. However, the electronic tablet 107 includes no integrated keyboard. It is noted, however, that a virtual keyboard may be displayed on the electronic tablet 107, and buttons thereof may be selected by the stylus that the user employs. Of course, it is noted that an alternative embodiment of such an electronic tablet may include no stylus and certain selections on such an electronic tablet may be made by a user's touch.

As can be seen, a wide variety of devices may employ a touchscreen to affect at least one part of an MMI thereto. There are various means by which a user's interaction with such a touchscreen can be detected.

Figure 2:
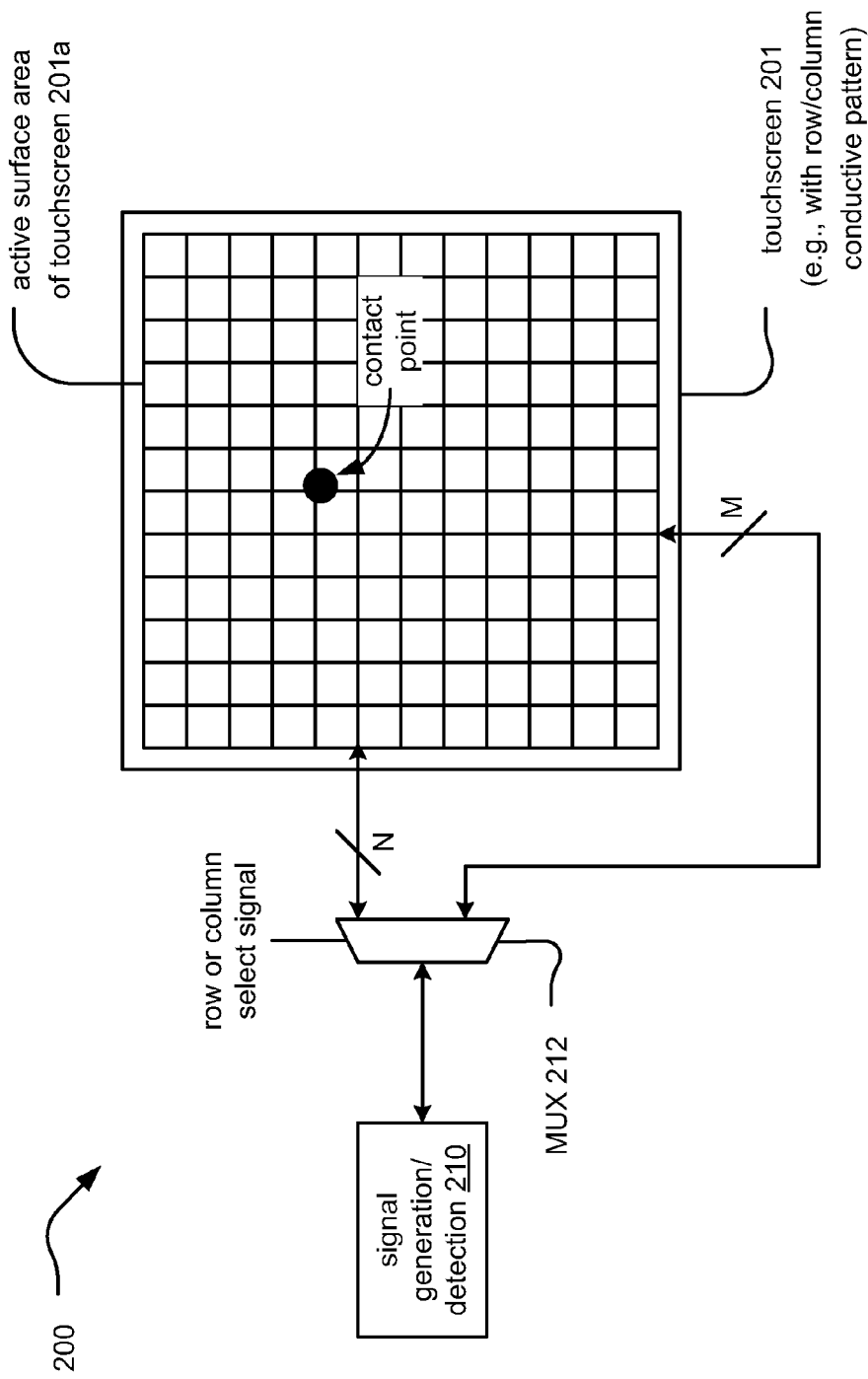
FIG. 2 illustrates an embodiment of a touchscreen in which zone detection is performed to detect a user's interaction with the touchscreen.

FIG. 2 illustrates an embodiment 200 of a touchscreen 201 in which zone detection is performed to detect a user's interaction with the touchscreen. Generally, FIG. 2 illustrates an embodiment 200 of a touchscreen in which zone scanning or detection is performed to locate a user's interaction with the touchscreen. In some embodiments, an active surface area of the touchscreen covers a slightly smaller portion of the touchscreen itself. For example, a border or perimeter around the active surface area of the touchscreen may be employed.

A number of conductors forming rows and columns of a conductive pattern (e.g., indium tin oxide (ITO) as may be deposited on a substrate composed of polyester or other material) on one or more layers of the touchscreen. In some embodiments, a first portion of the conductive pattern (e.g., the columns) is disposed on a first layer, and a second portion of the conductive pattern (e.g., the rows) is disposed on a second layer; the first and second layer may be separated by a dielectric material in some embodiments. Alternatively, the row and column oriented conductors may be disposed on the same layer and may utilize known techniques for connecting elements including traces, vias, bond wires, etc. to ensure that the first portion of conductive pattern (e.g., the columns) do not directly come into contact with the second portion of conductive pattern (e.g., the rows). While this and other embodiments depict rows and columns that are inherently perpendicular to one another, there may be other embodiments in which a plurality of first conductors are aligned in a first direction and a plurality of second conductors are aligned in a second direction that is different to the first direction wherein there is no particular requirements for the orientation of the first and second directions. In other words, the conductors need not necessarily be perpendicular to one another (though they may be perpendicular in one referred embodiment). Moreover, the conductors need not be oriented in vertical and horizontal axis though such orientation is shown in the described embodiments.

As stated above, in some embodiments, an active surface area of the touchscreen 201a covers a slightly smaller portion of the touchscreen 200. For example, a border or perimeter around the active surface area of the touchscreen 201a may be employed.

This embodiment 200 includes a signal generation/detection module 210 is employed both to provide a signal to a particular row and to detect a change in the signal being provided to that particular row. The signal generation/detection module 210 operates cooperatively with a MUX 212 to apply a signal and detect that signal being applied to each of the rows and columns of the conductive pattern of the touchscreen.

When a user interacts with the touchscreen, an increased capacitance will be introduced corresponding to the location of the user's interaction. This increased capacitance introduces a reduced impedance path at the location of the user's interaction and will incur a change in the signal being provided to a particular row or column. By providing a signal to each of the rows and columns of the conductive pattern of the touchscreen and by detecting for any change in those successively applied signals, then the location of the user's interaction with the touchscreen may be made.

Therefore, by detecting a change in a signal provided to a particular row and also by detecting a change in a signal provided to a particular column, an intersection of the identified row and column can provide a calculated estimate of the location of the user's interaction with the touchscreen.

For the zone detection approach described above (and also for cross point detection approaches elsewhere herein), the application of signals need not be purely successive in nature. For example, a signal need not necessarily be applied to row 1, then to row 2, then to row 3, etc. Alternatively, a signal may be applied to row 1, then to row 8, then to row 2, etc. In even another embodiments, a signal may be applied initially to every Nth row (where N is an integer), and then the signal may be applied to every row between 1 and N−1, then to rows N+1 to 2N−1, etc. A wide variety of scanning techniques may be performed in accordance with either of the cross point detection and the zone detection approaches of the previous embodiments.

Thus, FIG. 2 exemplifies scanning methodologies that may be employed with the conductive patterns and embodiments of the invention. Generally speaking, the shapes, widths, etc. of the various conductors of a touchscreen may be any desired shape, width, etc. without departing from the scope and spirit of the invention.

Figure 3A:
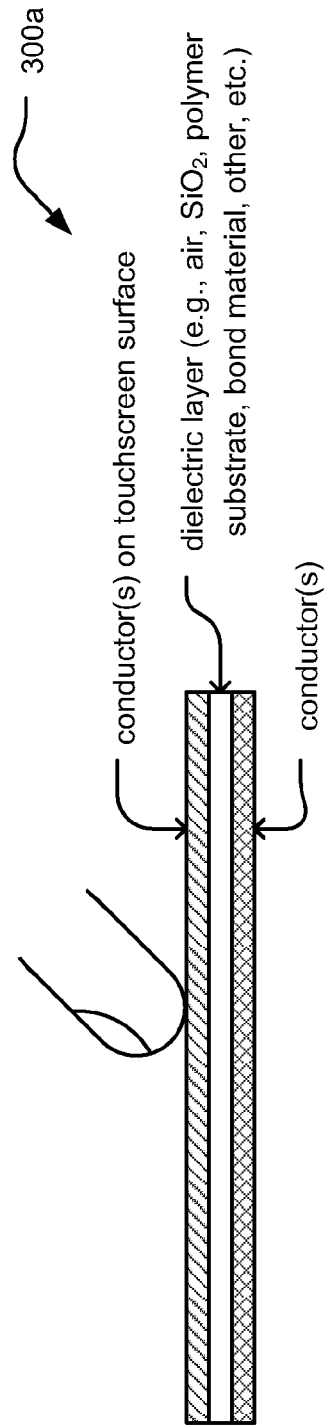
FIG. 3A illustrates an embodiment of placement of conductive patterns within a touchscreen.

FIG. 3A illustrates an embodiment 300a of placement of conductive patterns within a touchscreen. As may be seen, the top layer of first conductors (e.g., as disposed as a top layer of the touchscreen) may be directly touched by a user when interacting with the touchscreen. As may further be seen, a dielectric layer separates the first and second layers of conductors (plurality of first and second conductors, respectively). The dielectric layer may be implemented any known dielectric including but not limited to air, semiconductor materials including $SiO_2$, polymer substrate materials, bond materials, etc.

Figure 3B:
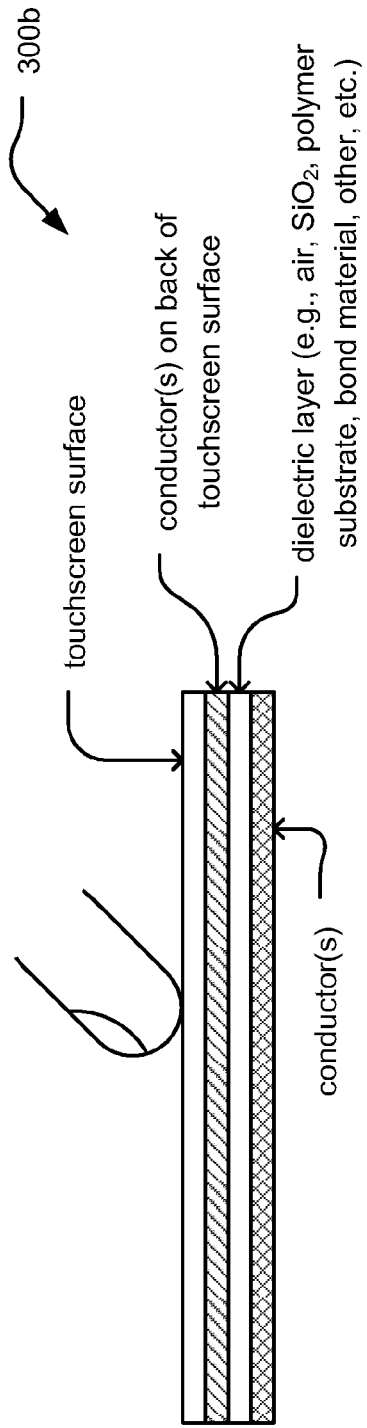
FIG. 3B illustrates an alternative embodiment of placement of conductive patterns within a touchscreen.

FIG. 3B illustrates an alternative embodiment 300b of placement of conductive patterns within a touchscreen. Specifically, an additional touchscreen surface layer (e.g., a polymer layer, a protective layer, or otherwise) is disposed on top of the top layer of conductors such that a user does not directly touch the top layer of conductors. Any known material for forming a touchscreen surface that allows user interaction with the plurality of first and second conductors as described herein may be used.

Within prior art systems, prior art conductive patterns as employed within a touchscreen are often composed of discrete diamond shaped touch areas that are connected together. A linear movement of a user's interaction with a touchscreen across the active area of the touchscreen with the prior art conductive patterns inherently introduces non-linearity in the signal response of signals used to detect such user's interaction. Ideally, the signal response would be as smooth and linear as possible, but prior art conductive patterns simply cannot provide for such a smooth and linear response. Because larger the pitch typically exists between conductors within a prior art conductive pattern, the number of different pads below the contact point is reduced and thus provides a "stair step" response in relation to the user's movement or location identification. This further exacerbates the deleterious effects inherent to the prior art discrete diamond shaped patterns employed within prior art touchscreens. This "stair stepping" of the output of a signal employed to detect such a user's interaction with the touchscreen thus is a function, with prior art designs, of the size of the diamond shaped touch areas. Increasing touch area size to correspond with the increases in pitch also produces an energy non-uniformity (e.g., extending normal to the surface of the touchscreen or in the z-axis direction if the x and y axes are deemed to be the touchscreen surface) between rows and columns that makes it more difficult to set touch/no-touch thresholds within a touchscreen system.

Embodiments of the novel touchscreen architecture presented herein, and equivalents thereof, can help provide a smoother and linear response to a user's interaction with a touchscreen including the instance when the user's interaction moves across the surface of the touchscreen even in a diagonal direction. In one embodiment, such a novel touchscreen uses an elongated intermeshed pattern in which a conductor has extensions or protrusions into an adjacent conductor thereby increasing the affect of linear meshing between those conductors.

In addition, a spacing or window in conductors of an upper and/or top layer (e.g., those closest to the user's interaction with the touchscreen) allow for increased meshing under the touch. The windows, protrusions, and/or extensions can be formed from any desired shape (e.g., diamonds, triangles, circles, etc.). In one preferred embodiment, elongated diamonds produce a good linear meshing between the horizontal and vertical axes. If desired, the extensions or protrusions from one conductor into another conductor can be implemented using a symmetrical design to allow for a linear area under the touch as a user's interaction with the touchscreen (e.g., a user's finger) transitions from a first conductor aligned in a first direction to a second conductor aligned in a second direction. Moreover, as the number of protrusions and/or extensions (e.g., which may be referred to as child components of a conductor) increases, so does the coupling, intermeshing, and interlacing increase between those conductors.

Figure 4:
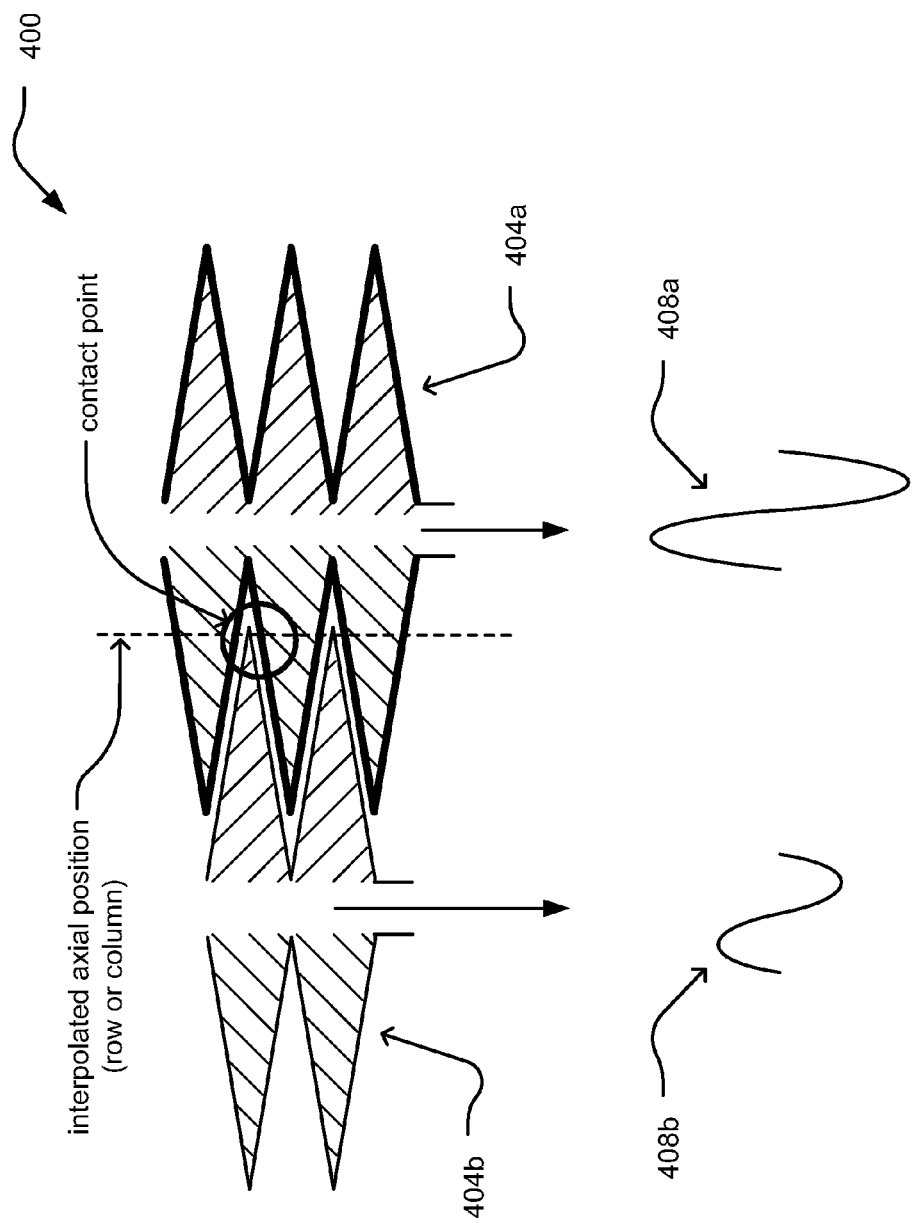
FIG. 4 illustrates an embodiment of a pair of conductors and associated signal responses from adjacent conductors of a conductive pattern

FIG. 4 illustrates an embodiment 400 of a pair of conductors and associated signal responses from adjacent conductors of a conductive pattern. For exemplary purposes, FIG. 4 illustrates meshed spurs of adjacent second conductors of a bottom layer though the principles discussed herein apply equally to interaction between adjacent first conductors of a top layer. Each conductor includes outwardly extending spurs that are interlaced with and mesh with spurs of the adjacent conductor. In prior art systems, an axial position corresponds to the axis of a contacted conductor. Here, however, because the outwardly extending spurs are tapered and become increasing smaller as they extend from the conductor axial center, a user's interaction with the touchscreen (e.g., contact point) can provide differing amounts of contact with the meshed spurs. As may be seen in FIG. 4, the contact point illustrates that the contacted area of the spur of conductor 404a is substantially greater that the contacted area of the spur of conductor 404b. Accordingly, a signal response of conductor 404a as shown at 408a is substantially greater than a signal response of conductor 404b as shown at 408b. As will be discussed below, the signal responses 408a can be compared to 408b to determine an interpolated axial position as shown in FIG. 4.

Figure 5:
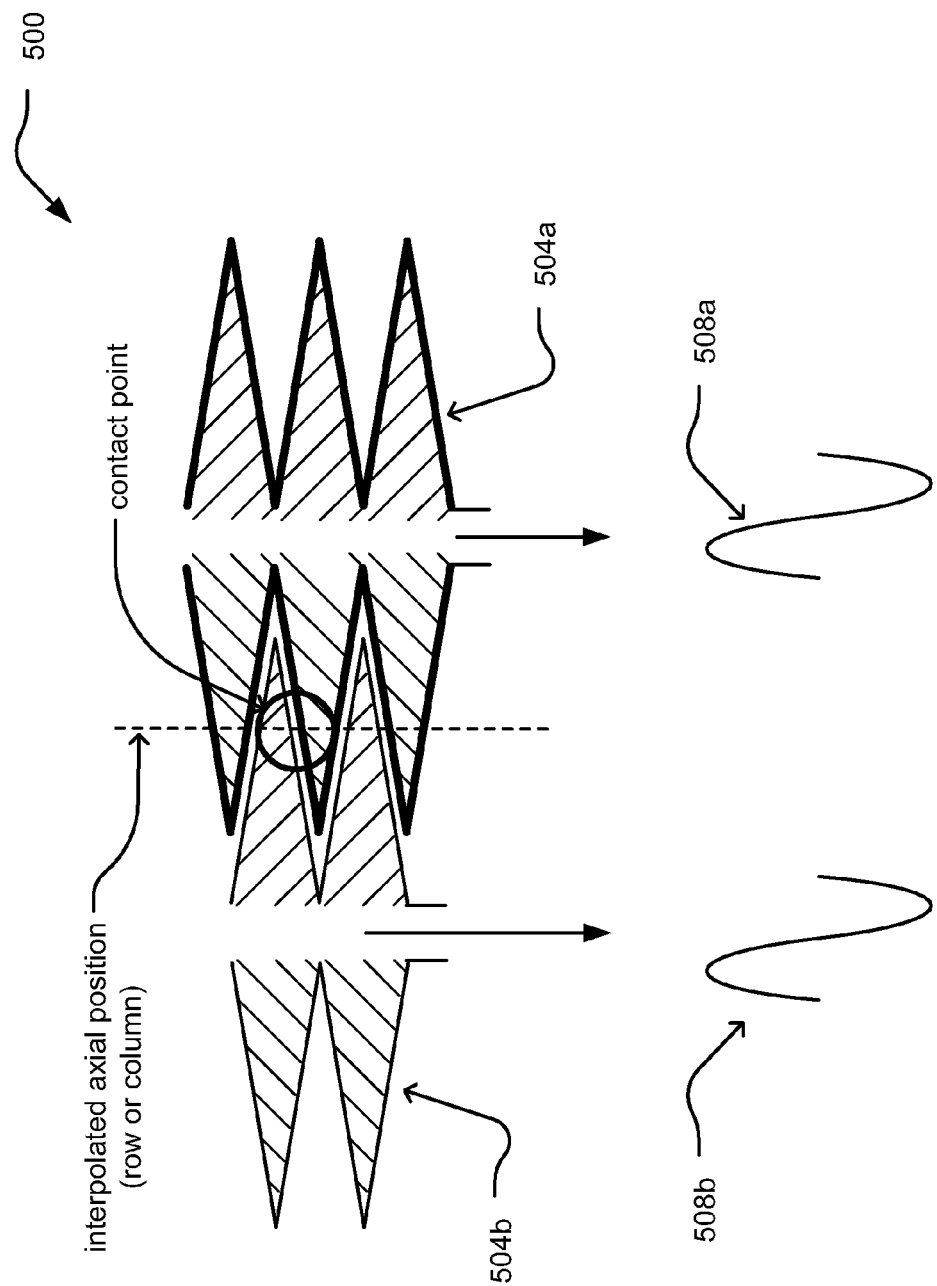
FIG. 5 illustrates an alternative embodiment of a pair of conductors and associated signal responses from adjacent conductors of a conductive pattern.

FIG. 5 illustrates an alternative embodiment 500 of a pair of conductors and associated signal responses from adjacent conductors of a conductive pattern. As may be seen, the contact point illustrates that the contacted area of the spur of conductor 504a is substantially equal to the contacted area of the spur of conductor 504b. Accordingly, a signal response of conductor 504a as shown at 508a is substantially equal to a signal response of conductor 504b as shown at 508b. As will be discussed below, the signal responses 508a can be compared to 508b to determine an interpolated axial position as shown in FIG. 5. As is suggested in FIG. 5, the interpolated axial position is the middle of the separation between the axial centers of conductors 504a and 504b.

While the embodiments 400 and 500 and the previous diagrams do in fact employs conductors having spurs that mesh with spurs of adjacent conductors, it is noted that, generally speaking, the shapes, widths, etc. of the various conductors of a touchscreen may be any desired shape, width, etc. and still operate in accordance with various aspects of the invention. In general, the shapes, widths, etc. of the various conductors of a touchscreen may be simplistic and straight (e.g., see FIG. 16, FIG. 17, and FIG. 18) as well and the overall touchscreen system may still employ various aspects of the invention presented herein.

Figure 6:
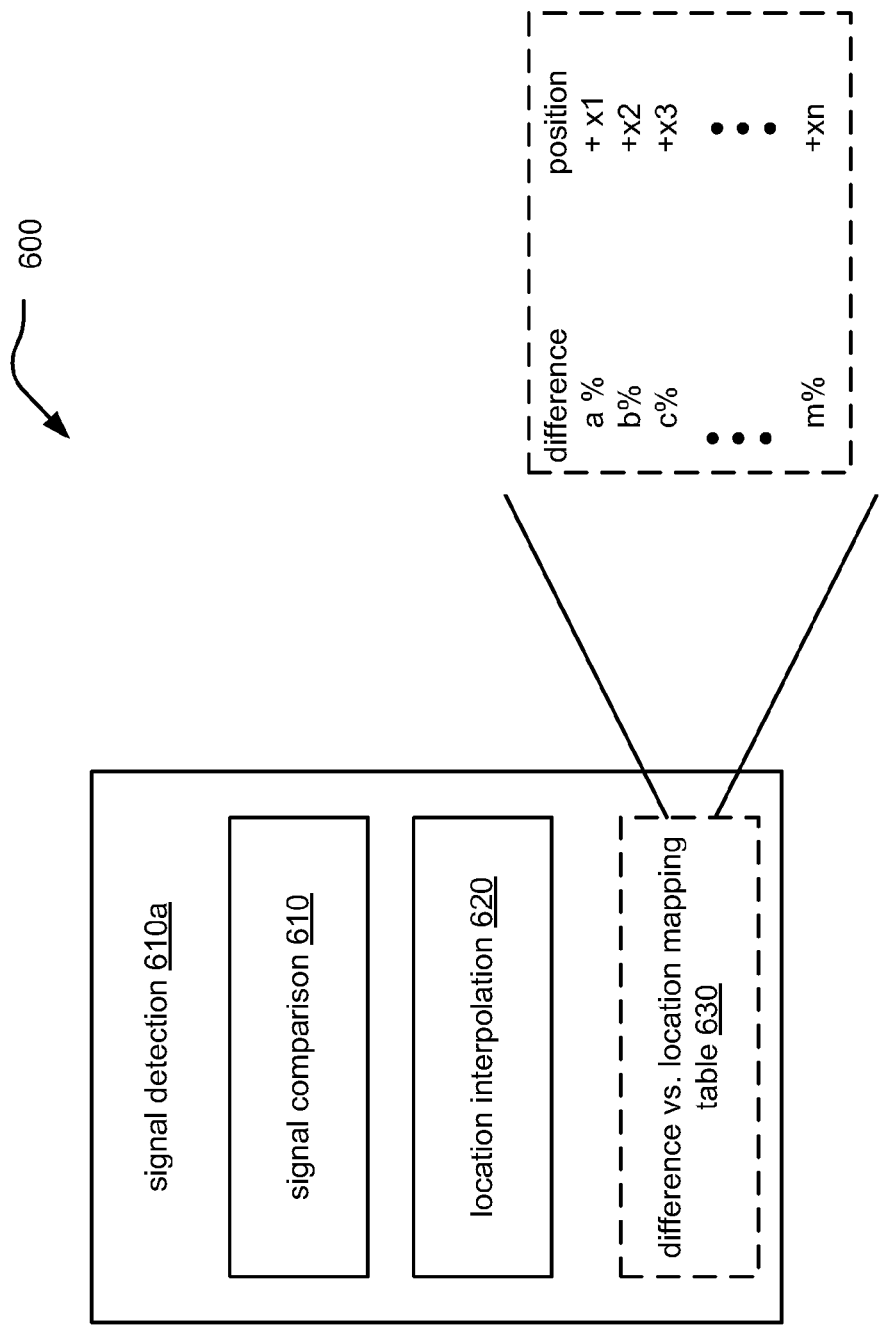
FIG. 6 illustrates an embodiment of a signal detection module.

FIG. 6 illustrates an embodiment 600 of a signal detection module 610a. In this embodiment 600, the signal detection module 610a can be implemented using any of the embodiments described herein (e.g., see FIG. 8A and FIG. 9). Generally, the signal detection module 610a of embodiment 600 includes a signal comparison module 610, a location interpolation module 620, and a mapping table 630 that includes a mapping of response signal differences in relation to axial positions. The axial positions are the interpolated axial positions. Generally, signal comparison module 610 compares the signal responses (e.g., as illustrated in FIGS. 4 and 5) and determines a difference. For example, a difference may be described in terms of a percentage of the signal response of one conductor in relation to the other conductor. The differences may also be described in terms of absolute measurements (e.g., volts or amps).

Based on the determination of signal comparison module 610, location interpolation module 620 is operable to determine the interpolated axial position of a touch. This may be done through a computer implementable method that computes the position or by communicating with mapping table 630 to obtain a mapped result for a detected difference in signal responses. In one embodiment, mapping table 630 specifies a range of differences for each interpolated position value. Thus, for example, if there are 200 interpolated positions, each position may define a range of ½ of 1% of difference values. The different ranges may be specified in numerical values of a device or signal characteristic or in terms of relative differences (e.g., percentages as shown).

Figure 7:
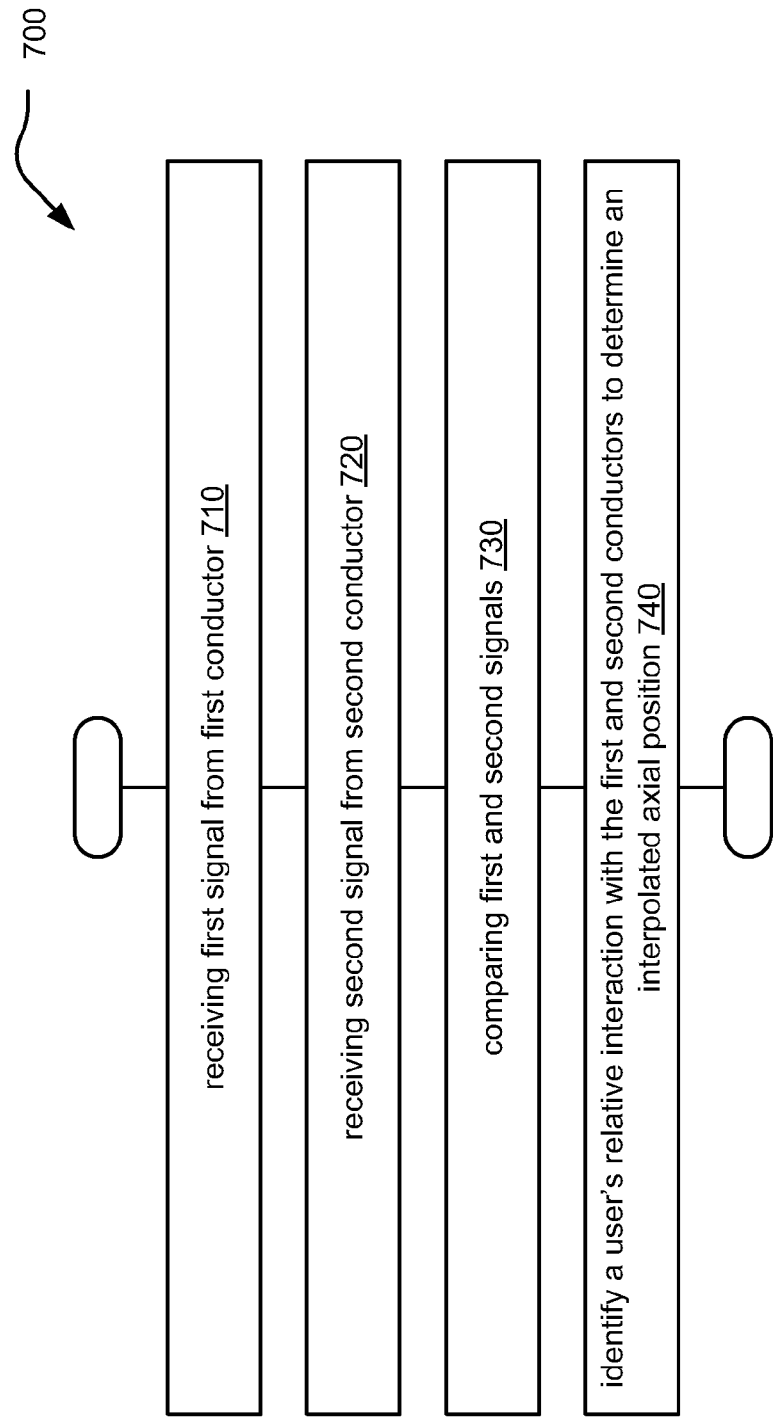
FIG. 7 illustrates an embodiment of a method for determining an interpolated axial position.

FIG. 7 illustrates an embodiment 700 of a method for determining an interpolated axial position. The method operates by receiving a first signal or signal response from a first conductor, as depicted in block 710 and receiving a second signal or signal response from a second conductor, as depicted in block 720. Thereafter, the method includes comparing the first and second signals in block 730 to identify a user's relative interaction with the first and second conductors to determine an interpolated axial position in block 740. Such processing can be as illustrated, for example, in the approach suggested in FIG. 6 wherein the interpolated position is determined by evaluating a detected difference in relation to a mapping table. Alternatively, the interpolated position may be calculated wherein, for example, size differences in the signals may be used as inputs to an algorithm for determining a relative location.

Figure 8:
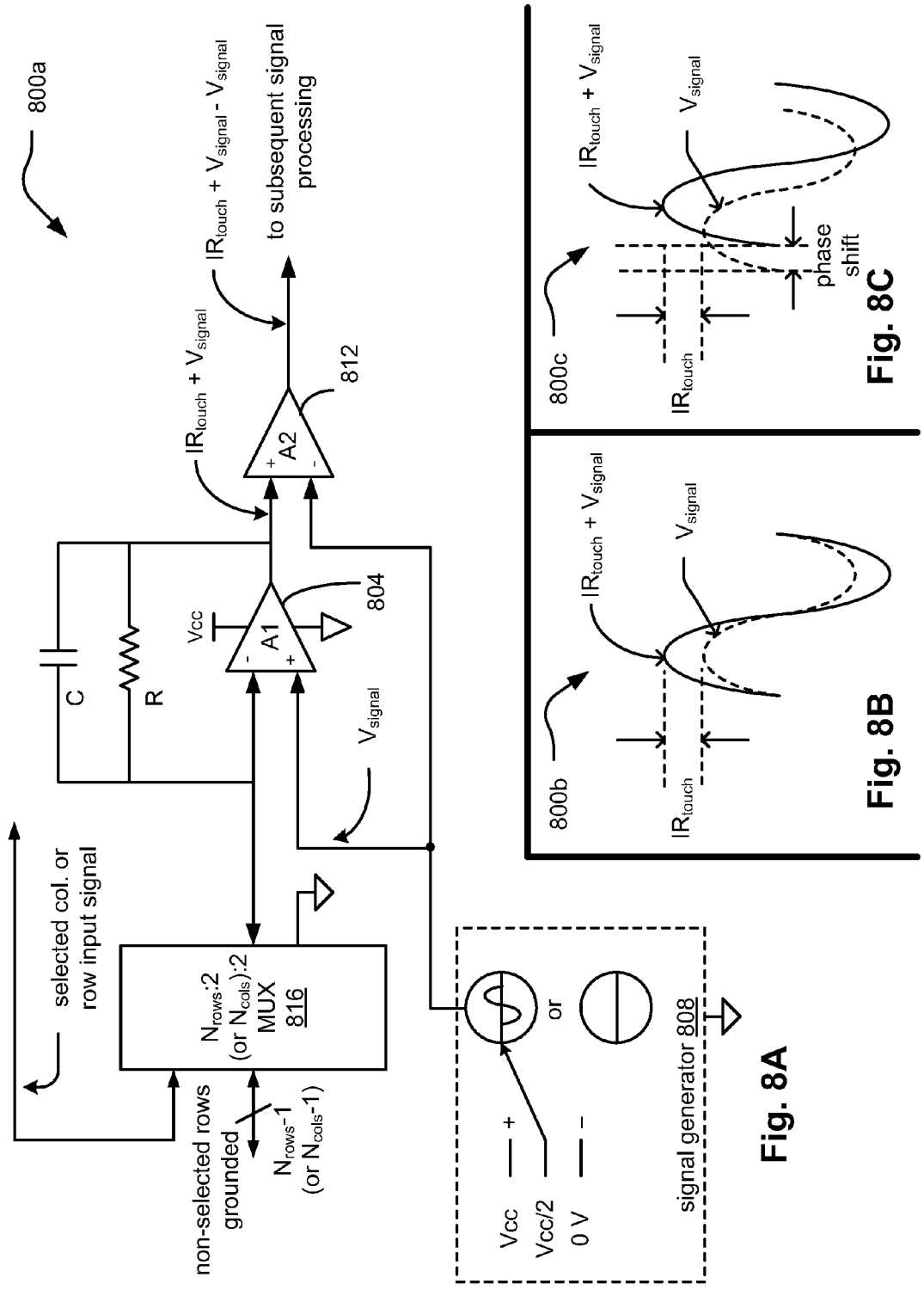
FIG. 8A is a functional block diagram of signal generation and detection circuitry for detecting touch on a touchscreen according to one embodiment of the invention.
FIG. 8B is a signal diagram that illustrates operation of signal generation and detection circuitry for detecting touch on a touchscreen according to one embodiment of the invention.
FIG. 8C is a signal diagram that illustrates operation of signal generation and detection circuitry for detecting touch on a touchscreen according to one embodiment of the invention.

FIG. 8A is a functional block diagram of signal generation and detection circuitry for detecting touch on a touchscreen according to one embodiment of the invention. A circuit 800a includes amplification circuitry 804 that, based on an input signal, generates an output signal and a feedback signal. The feedback signal may be coupled to a first conductor of a plurality of first conductors or to a second conductor of a plurality of second conductors for either zone or cross point scanning for touch detection. As may be seen, amplification circuitry 804 is coupled to receive the input signal $V_{signal}$ from a signal generator 808. More specifically, input signal $V_{signal}$ is received at a positive input of amplification circuitry 804. Further, a parallel combination of a capacitor C and a resistor R, of any desired sized values, are coupled between an output of amplification circuitry 804 and a negative input of the amplification circuitry 804. Accordingly, a feedback signal is coupled from the output of amplification circuitry 804 to the negative input. The output of amplification circuitry 804 is also coupled to a positive input of amplification circuitry 812.

As may also be seen, the feedback signal is also provided externally to one of the conductors aligned in a first or second direction (e.g., to a column or row conductor) as a touchscreen input signal for a touchscreen. More specifically, the feedback signal is provided to a selected conductor (e.g., a row or column conductor) by way of a MUX 816. Here, MUX 816 is an N:2 MUX (where "N" represents a number of conductors in a first direction (e.g., rows) or columns to which the MUX is coupled).

The N:2 MUX 816 operates by coupling the feedback signal through to a selected conductor of the touchscreen and couples all of the non-selected conductors of the touchscreen to a ground potential level. In other words, in one embodiment, each of the conductors coupled to the N:2 MUX 816 is coupled to the ground potential level or to the feedback signal at any given time, and it is again noted that only one of the conductors is coupled to the feedback signal at any given time (during which all of the other conductors are coupled to the ground potential level). If desired, two or more conductors could also be coupled to the feedback signal at a given time (during which all of the other/remaining conductors are coupled to the ground potential level) to effectuate a larger surface area of conductive material (e.g., two or more conductors, which may or may not be adjacent, effectively operating as 'one' conductor). This principle may also be extended to detecting signals from two or more conductors as well (which together effectively operate as 'one' conductor) as compared to detecting a signal from only one conductor at a time.

Thus, if a user is touching the touchscreen, and more particularly, a portion of the touchscreen that overlaps a conductor to which the feedback signal is being produced, a signal characteristic of the feedback signal changes because of a change in capacitance of the conductor with which the user is interacting. The change in capacitance thus changes a signal characteristic (e.g., signal current, voltage, frequency characteristics, or other property) of the touchscreen input signal. An output of amplification circuitry 804 is thus the sum of a signal $IR_{touch}$ (e.g., output of amplification circuitry 804) and the original input signal $V_{signal}$.

Signal generator 808 is operable to produce one of a plurality of input signal types according to a control command that is based upon a mode of operation. In one embodiment, signal generator 808 produces an alternating current (AC) signal that may have a direct current (DC) voltage component (e.g., a DC offset) or the signal generated thereby may not have a DC offset component. Alternatively, signal generator 808 produces a null signal that may be viewed as being constant DC voltage signal. In one mode of operation, signal generator 808 produces the AC signal for use when performing a zone scanning step to detect a touch. In another mode of operation, signal generator 808 produces the null signal to support a cross point detection of a touch to receive a signal provided on a conductor of a different group of conductors (e.g., column conductors arranged on a bottom layer closest to the liquid crystal display elements of the touchscreen).

Generally, it is noted that the signal generated by signal generator 808 (or any other signal generator or signal generator/detector as described herein) can have any desired characteristics in terms of amplitude, frequency, shape, and/or any other parameter as desired for a given embodiment. Certain embodiments may employ sinusoidal shaped signals, others may employ rectangular or square shaped signals, etc. Clearly, different instantiations of signal generator 808 (or any other signal generator or signal generator/detector as described herein) may employs signals having different characteristics as well without departing from the scope and spirit of the invention.

In operation, a user's touch increases the total capacitance (thereby reducing impedance) for the conductor being touched which thereby increases a current of the touchscreen input signal. The current is pulled through the feedback resistor, R, causing a voltage drop. The amplification circuitry 804 produces an increased magnitude signal to keep both the positive and negative inputs of the amplification circuitry 804 constant. Thus, the amplification circuitry 804 output signal includes a component that results from the touch that is characterized as $IR_{touch}$.

The signal generation circuitry for detecting a touch of a touchscreen also includes a second amplification circuitry 812 that produces a response signal based on a difference between the input signal provided by signal generator 808 and the output signal of first amplification circuitry 804, wherein the response signal corresponds to a user's interaction with the touchscreen. More specifically, amplification circuitry 812 produces the signal $IR_{touch}$. As may be seen, second amplification circuitry 812 is coupled to receive the output of first amplification circuitry 804 as well as the input signal $V_{signal}$ provided by signal generator 808. The input signal $V_{signal}$ provided by signal generator 808 is received at a negative input of second amplification circuitry 812 while the output of the output of first amplification circuitry 804 is received at a positive input of second amplification circuitry 812. The output of second amplification circuitry 812 therefore is equal to the component $IR_{touch}$ because the input signal has been cancelled (subtracted) from the output of first amplification circuitry 804 that includes $IR_{touch}$ as well as input signal $V_{signal}$.

FIG. 8B is a signal diagram 800b that illustrates operation of signal generation and detection circuitry for detecting touch on a touchscreen according to one embodiment of the invention. More specifically, a first signal, which represents the output of first amplification circuitry 804 (in FIG. 8A) is the sum of $IR_{touch}$ and $V_{signal}$. The input signal $V_{signal}$ is shown also. Accordingly, the difference between the two signals is the signal $IR_{touch}$. Generally, without a user's touch of the touchscreen to change the capacitance of the conductor, the output of first amplification circuitry 804 (in FIG. 8A) is merely $V_{signal}$. An increase in capacitance resulting from a touch, however, increases a magnitude of the signal of the touchscreen input signal thus creating the component $IR_{touch}$.

FIG. 8C is a signal diagram 800c that illustrates operation of signal generation and detection circuitry for detecting touch on a touchscreen according to one embodiment of the invention. This embodiment is somewhat analogous to the previous diagram with at least one difference being that the signal $IR_{touch}$ and $V_{signal}$ also includes some phase shift when compared to the input signal $V_{signal}$. In other words, not only may the amplitude of the signal $IR_{touch}$ and $V_{signal}$ have some amplitude difference when compared to the input signal $V_{signal}$, but it may also have incurred some phase shift relative to the input signal $V_{signal}$. Either one or both of the amplitude and phase of the $IR_{touch}$ and $V_{signal}$ may be employed to discriminate a user's interaction with the touchscreen.

Figure 9:
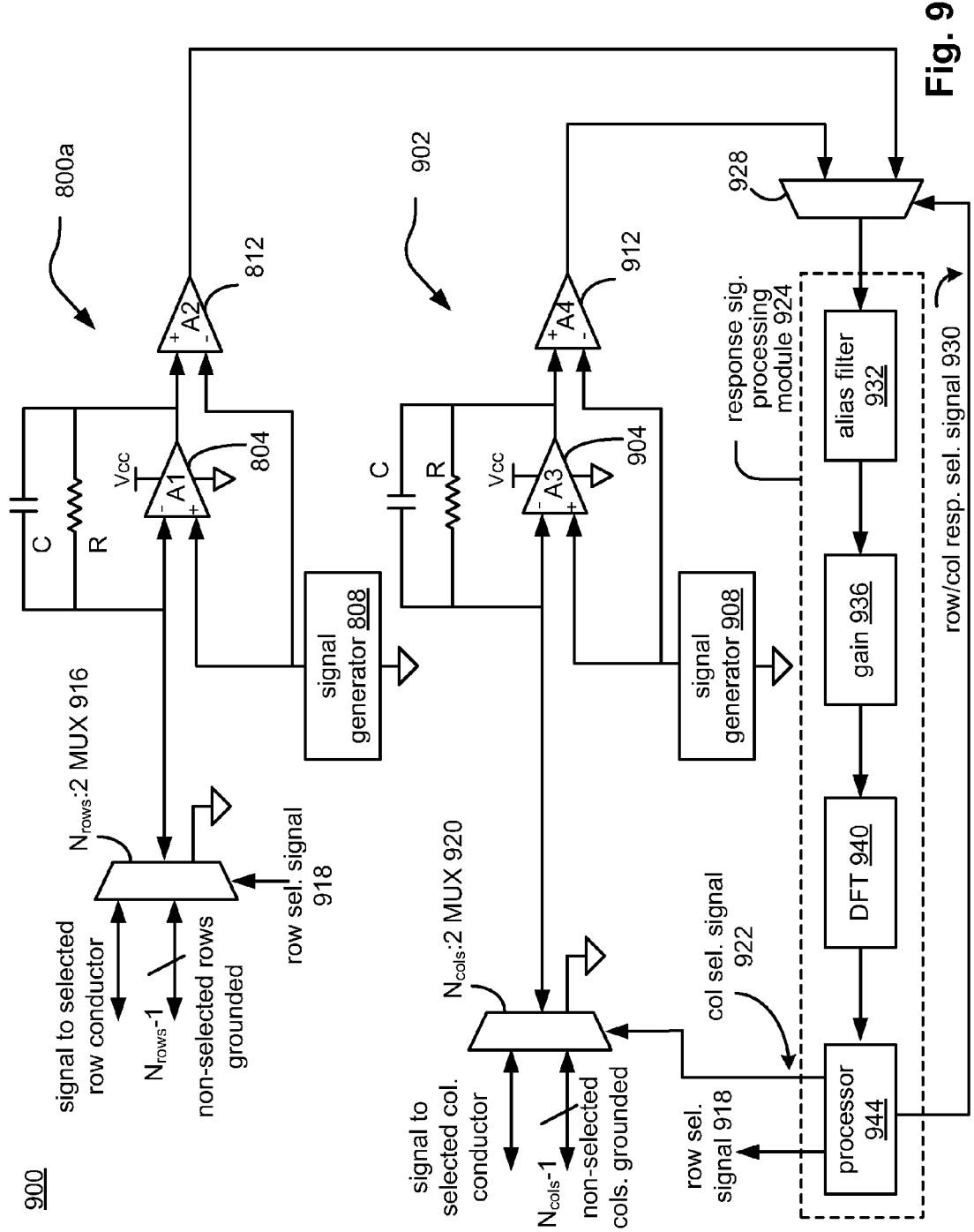
FIG. 9 is a functional block diagram of signal generation circuitry for detecting touch on a touchscreen according to one embodiment of the invention that includes a plurality of signal generation and detection blocks.

FIG. 9 is a functional block diagram of signal generation circuitry for detecting touch on a touchscreen according to one embodiment of the invention that includes a plurality of signal generation and detection blocks. More specifically, the circuitry 900 of FIG. 9 includes circuitry 800a as well as circuitry 902 that is similar to circuitry 800a. More specifically, circuitry 902 includes a third amplification circuitry 904 that, based on at least one additional input signal, generates at least one additional output signal and at least one additional feedback signal, wherein the at least one additional feedback is signal is coupled to a first conductor of a plurality of second conductors. As with circuitry 800a, third amplification circuitry 904 includes two inputs coupled to receive an input signal provided by a signal generator, here signal generator 908, as well as a feedback signal conductor through a parallel combination of R and C (of any particular design selected values). The input signal, in the described embodiment, is similar to the signals provided by signal generator 808 of FIG. 8A. In a system that employs both circuitry 800a and 902 as shown herein in FIG. 9, the zone scanning and cross point scanning functions are interchangeable and may be performed according to user specification.

Additionally, the feedback signal of the third amplification circuitry 904 is provided as a touchscreen input signal to a conductor of a plurality of second conductors (in contract to the plurality of first conductors). Circuitry 902 further includes a fourth amplification circuitry 912 that produces at least one additional response signal based on at least one additional difference between the at least one additional input signal and the at least one additional output signal, wherein the at least one additional response signal also corresponding to the user's interaction with the touchscreen. Circuitry 902 may therefore also be used to detect that a conductor of the plurality of second conductors is being touched. Additionally, while only one circuitry 804 or 904 may be used for detecting a touch of the touchscreen, using a zone scanning technique, having two such circuitries, namely, 804 and 904, enables cross point scanning or detection also to be performed which is helpful for detecting a multi-point touch wherein a user is touching the touchscreen in multiple locations simultaneously. Further explanation of using both zone scanning and cross point scanning will follow in relation to discussions for figures that follow FIG. 9.

As may further be seen, a multiplexor (MUX) 916 is coupled to provide the feedback signal of amplification circuitry 804 to a selected conductor of the plurality of first conductors while a second MUX 920 is coupled to provide the feedback signal of amplification circuitry 904 to a selected conductor of the plurality of second conductors. Specifically, if the plurality of first conductors comprise rows of conductors while the plurality of second conductors comprise columns of conductors, each of the MUXs 916 and 920 receives a corresponding row or column select signal 918 or 922, respectively, provided by logic or by a processor. Accordingly, cross point detection may be used by controlling the coupling row and column conductors of a touchscreen to circuitry 800a and circuitry 902, respectively. Alternatively, circuitry 800a or 902 may also be used for zone detection by merely evaluating a signal characteristic of the touchscreen input signal as described above.

In the described embodiment, circuitry 900 further includes a signal response processing module 924 that processes the response signal (e.g., of circuitry 800a) and at least one additional response signal (e.g., of circuitry 902) to identify a location of the user's interaction with the touchscreen. In one embodiment, module 924 includes an alias filter 932 that receives a selected response signal provided by MUX 928, based on a row/col. response select signal 930, a gain module 936, a Discrete Fourier Transform (DFT) module 940, and a processor 944.

It is also noted that more than one instantiation of the signal response processing module 924 may be implemented so that two or more separate signal response processing modules could operate in parallel/simultaneously with one another (e.g., each operating at different frequencies, each operating to service different portions/segments [such as quadrants] of a touchscreen, etc.).

Each of modules 932-940 processes the selected response signal to produce a processed response to enable processor 944 to determine whether a touch has occurred and a location of the touch or of the multiple touch locations of a multi-point touch. Generally speaking, the module 924 can perform any of a desired number of operations to the signals provided thereto including gain adjustment, filtering, various frequency-time transformations (e.g., DFT), etc. without departing from the scope and spirit of the invention.

In one embodiment, synchronous signals are applied to one or both circuits. The resulting waveform can be phase and amplitude nulled via a fixed analog circuit or an adaptive digital to analog circuit. The signal is then synchronously demodulated via a DFT function. The DFT function can be varied in length and sample speed to adjust filtering and response times and its envelope function can be varied to pass signal frequencies or reject unwanted noise frequencies. The resulting data provides phase, amplitude, and magnitude. The columns in the various directions (e.g., rows and columns) are scanned using various methods to acquire from one finger touch to a total field map of all the cross points in the touchscreen system.

Generally, these blocks represent digital processing blocks that may be defined according to design requirements as understood by one of average skill in the art. As may further be seen, processor 944 of module 924 generates row select signal 918 to select a row oriented conductor to receive a touchscreen input signal, column select signal 922 to select a column to receive a touchscreen input signal, and row/col. response select signal 930 to select response signals from corresponding rows/column oriented conductors.

In operation, circuitry 900 supports using either circuitry 800a or 902, or both, to perform "zone" scanning or detection to detect a touch of a touchscreen approximate to a conductor. References herein to "touching" a conductor should be understood to include touching the touchscreen in a location approximate to the conductor wherein a capacitive value of the conductor changes.

Zone detection is beneficial in that it allows a touch to be detected quickly with, potentially, a much smaller number of detection steps. For example, for a single touch of a touchscreen having twenty rows and twenty columns, zone detection techniques allow the touch point to be determined in 40 detection steps or less. A detection step is merely evaluating a row or column conductor signal response to determine if a touch occurred. Using cross point detection methods, however, in which every column is evaluated in relation to every row, up to 400 detection steps are required to determine a touch location.

Circuitry 900 also supports cross point detection. Thus, while one of circuitry 800a and 902 provides a signal that is coupled to a selected conductor, e.g., a column conductor, the other of circuitry 800a and 902 may be used to detect a touch on any of the associated conductors. Thus, according to the operation of the embodiment using circuitry 900, zone detection may be used to detect possible touch locations for a multi-point touch (e.g., a user using multiple fingers to touch multiple locations of the touchscreen simultaneously) and then cross point detection may be used to evaluate the possible touch locations to determine actual touch locations (e.g., to eliminate false touch locations in a list of possible touch location that have been generated using zone detection techniques). Accordingly, circuitry 900 supports using a combination of zone and cross point detection techniques to determine efficiently a plurality of touch locations for a multi-point touch without requiring cross point detection techniques for all 400 possible touch locations (e.g., in a 20 by 20 touchscreen). A more detailed description of such operation will be provided in relation to figures that follow.

Figure 10:
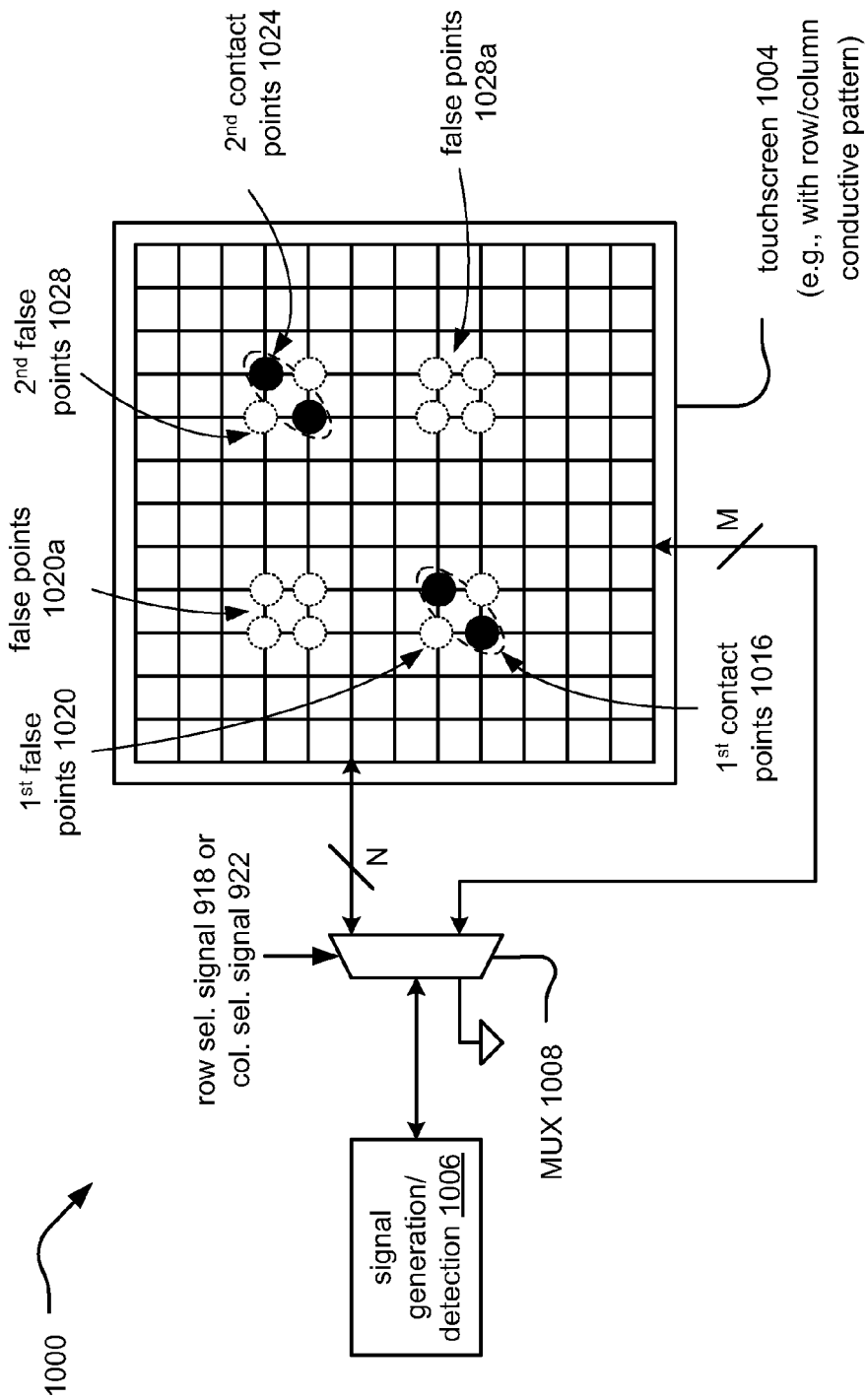
FIG. 10 illustrates an embodiment of a touchscreen in which zone scanning for touch detection is performed to locate a user's interaction with the touchscreen for a multi-point touch.

FIG. 10 illustrates an embodiment 1000 of a touchscreen 1004 in which zone scanning for touch detection is performed to locate a user's interaction with the touchscreen for a multi-point touch. A signal generation/detection module 1006 generates and provides a touchscreen input signal to a MUX 1008 that couples the touchscreen input signal to a selected row or column based on a row select signal 918 or a column select signal 922. Signal generation/detection module 1006 can comprise, for example, either circuitry 800a, or 902, or both as described in relation to FIGS. 8A and 9.

In operation, the touchscreen input signal (also described as the feedback signal in relation to FIG. 8A, for example), is provided to each of a plurality of first conductors (e.g., rows) and then to a plurality of second conductors (e.g., columns) in a sequential manner in a "zone" detection scheme. If there is only one touch location, the signal magnitude or current is increased to produce the $IR_{touch}$ component described previously for one of the first conductors and one of the second conductors to identify a touch location. Here, the touch location is the crossing point of the two conductors that have the $IR_{touch}$ component in the feedback signal (which is also in the response signal).

In the case of multiple touch locations for a multi-touch, however, a plurality of possible multi-touch locations become identified using zone detection wherein some of the possible touch locations are actual touch locations while others are false touch locations. To illustrate, for two touch locations indicated as $1^{st}$ contact points 1016 in FIG. 10, zone detection techniques identify four possible locations that include the $1^{st}$ contact points 1016 and the first false (or phantom) points 1020. Similarly, for the $2^{nd}$ contact points 1024, the $2^{nd}$ contact points 1024 as well as $2^{nd}$ false points 1028 are identified. It is noted that zone scanning will also identify false (or phantom) points 1020a and false (or phantom) points 1028a. The reader is also referred to FIG. 19 and its associated description below for additional details regarding how these additional false (or phantom) points 1020a and 1028a may occur in accordance with zone scanning.

The reason that false points 1020 and 1028 exist is that the zone detection techniques only identify row or columns in a sequential manner, and it is their cross sections that identify possible touch locations. Because, for example, touched columns are identified sequentially after the rows are identified sequentially (or vice versa), the identification of two rows and two columns as being touched results in there being four possible touch locations. Thus, for two touch locations identified as $1^{st}$ contact points 1016, as may be seen, two rows and two columns would contain the $IR_{touch}$ component thus identifying the $1^{st}$ contact points 1016 as well as the first false points 1020 using zone scanning or detection. Using zone scanning for four actual/real touch locations of a multi-point touch, shown here in FIG. 10 as $1^{st}$ contact points 1016 and 2$^{nd}$ contact points 1024 thus results in there being sixteen (16) possible touch locations since the possible touch locations also include 1$^{st}$ and 2$^{nd}$ false points 1020 and 1028 as well as false points 1020a and 1028a. One advantage of using zone detection techniques, even for multi-touch detection, is that touch areas can be identified quickly in a minimal number of detection steps. For example, these 16 possible touch locations can be identified in 40 or less detection steps for a 20 by 20 touchscreen (e.g., 20 rows conductors and 20 column conductors). In contrast, using cross point detection alone would require 400 detection steps to identify the four actual touch locations.

The embodiments of the present invention provide equally precise results as cross point scanning all possible contact points; however, these embodiments operate by using a combination of zone and cross point detection. Thus, zone detection is used to identify the 16 possible touch areas (in this example) and then cross detection is used for the touch areas to identify the actual contact points and to eliminate the false points from the list of possible touch locations.

Figure 11:
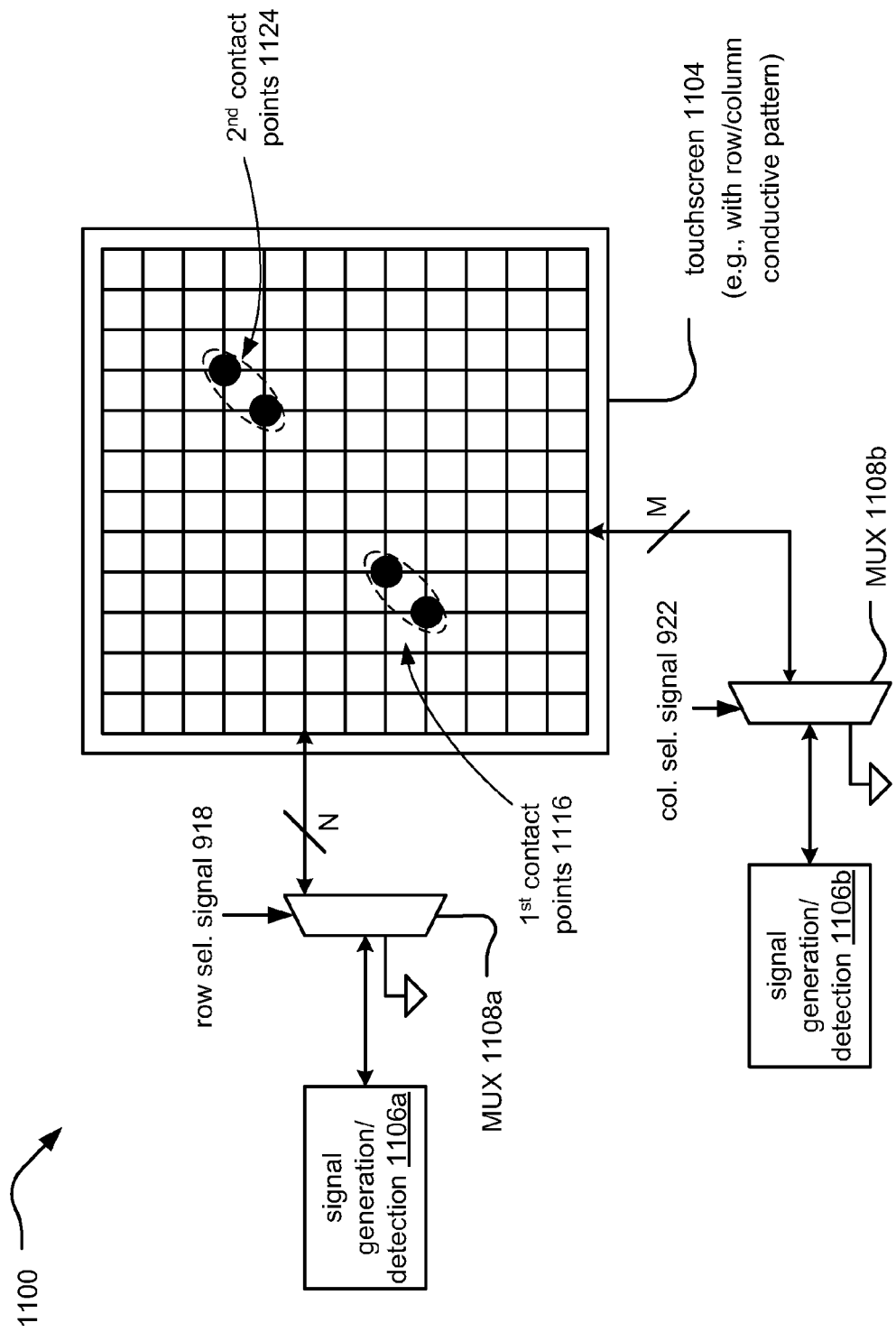
FIG. 11 illustrates an embodiment of a touchscreen in which cross point scanning is performed to locate a user's interaction with the touchscreen for a multi-point touch according to one embodiment of the invention.

FIG. 11 illustrates an embodiment 1100 of a touchscreen 1104 in which cross point scanning is performed to locate a user's interaction with the touchscreen for a multi-point touch according to one embodiment of the invention. A signal generation/detection module 1106a provides a touchscreen input signal to a MUX 1108a that provides the touchscreen input signal to a selected row based on a row select signal 918 of FIG. 9. Signal generation/detection module 1106a can comprise, for example, either circuitry 800a, or 902, as described in relation to FIGS. 8A and 9. A signal generation/detection module 1106b provides a touchscreen input signal to a MUX 1108b that provides the touchscreen input signal to a selected column based on column select signal 922. Signal generation/detection module 1106b can comprise, for example, either circuitry 800a, or 902, as described in relation to FIGS. 8A and 9.

In operation, logic operations and/or circuitry may be employed for generating row and column select signals 918 and 922 (e.g., using processor 944 of FIG. 9), determine one or more cross point scan areas based on the list of possible touch locations identified during the zone detection steps.

In the embodiment 1000 of FIG. 10, signal generation/detection module 1006 provides a signal to a MUX 1008 that selectively applies the signal from the signal generation/detection module 1006 to a first conductor of a first plurality of conductors (e.g., to a selected row or column) of the conductive pattern and then to a first conductor of a second plurality of conductors (to a selected column or row).

Here in embodiment 1100 of FIG. 11, however, the touchscreen input signal is applied to a first conductor of a first plurality of conductors (e.g., column oriented conductors) by signal generation/detection module 1106b and a signal generation/detection module 1106a receives a signal from MUX 1108a from one of the conductors of the second plurality of conductors (e.g., selected rows) of the conductive pattern. Generally, the signal that is provided to a first conductor by the signal generation/detection module 1106a is capacitively coupled to a second conductor at a touch location and is received by the signal generation/detection module 1106b, or vice versa.

Cross point scanning is capable to scan each and every point of the touchscreen (i.e., each point corresponding to an intersection of a row conductor and a column conductor of the touchscreen). However, only a subset of all of the points in the touchscreen can be cross point scanned as desired in an alternative embodiment. As can be seen in this embodiment 1100 when compared to the previous embodiment 1000 of FIG. 10 (that performs zone scanning), there are no false points identified in accordance with the cross point scanning. For example, only real/actual 1$^{st}$ contact points 1116 and 2$^{nd}$ contact points 1124 are identified in accordance with cross point scanning.

For example, when a user interacts with the touchscreen, the increased capacitance (decreased impedance) will be introduced in the conductive pattern corresponding to the location of the user's interaction. This increased capacitance introduces a reduced impedance path due to the increased capacitance between a row and column (e.g., first and second conductors) as caused by the user or the implement (e.g., stylus) employed by the user. Because capacitive reactance, $Z_C$, scales inversely with capacitance (i.e., because $Z_C=1/j\omega C$, where $\omega$ is frequency in radiance per second, and C is capacitance in farads), the impedance decreases as capacitance increases with a user's touch at the touch location. Therefore, by detecting a change in a signal provided to a particular row and detected at a particular column, a determination of the location of the user's interaction with the touchscreen may be made.

Figure 12:
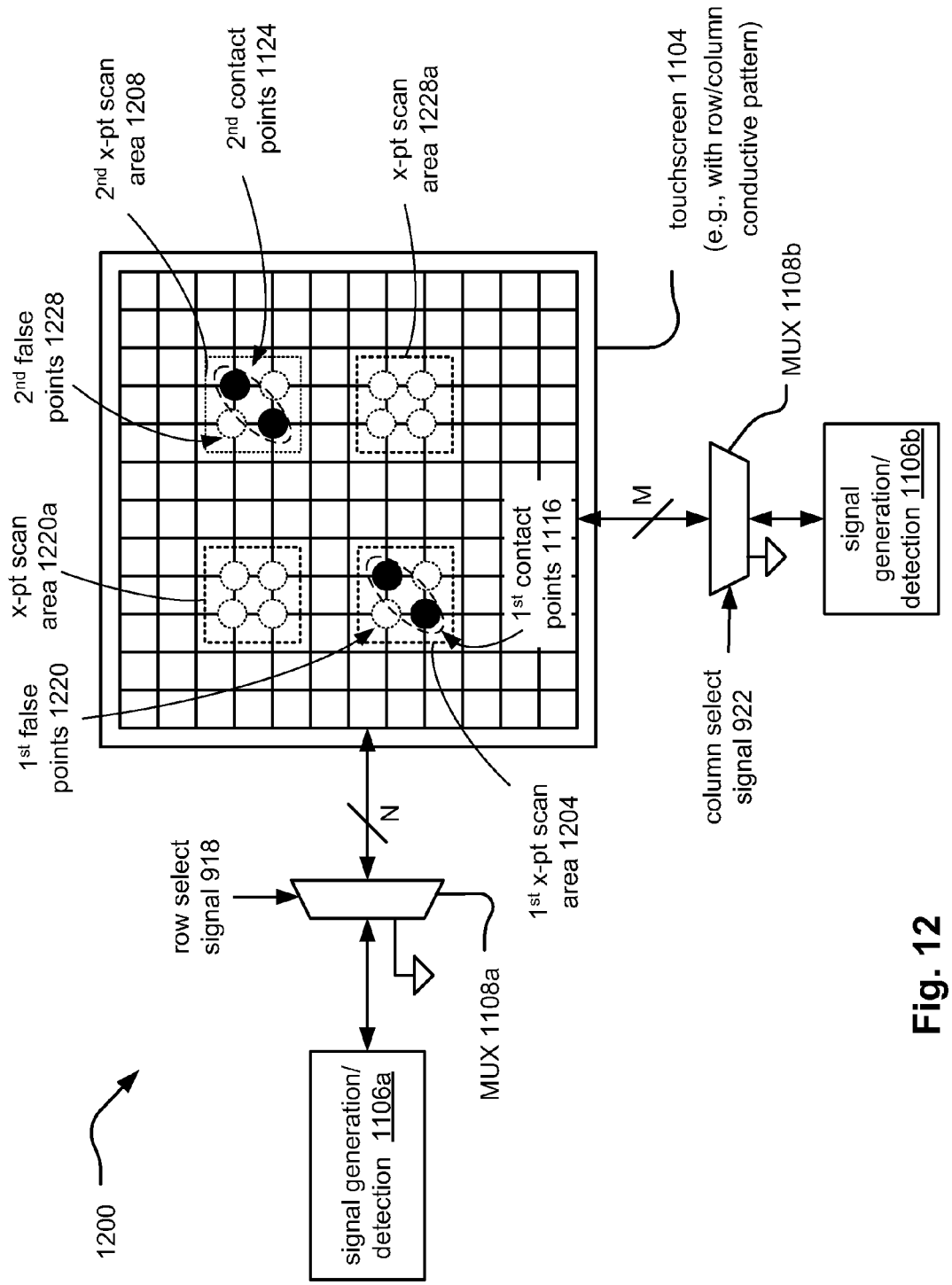
FIG. 12 illustrates an embodiment of a touchscreen in which cross point scanning is performed to locate a user's interaction with the touchscreen for a multi-point touch according to one embodiment of the invention.

FIG. 12 illustrates an embodiment 1200 of a touchscreen 1204 in which cross point scanning is performed to locate a user's interaction with the touchscreen for a multi-point touch according to one embodiment of the invention. Many components in this diagram are same as depicted in embodiment 1100 of FIG. 11, and they are referred to using common reference numerals.

However, in embodiment 1200 of FIG. 12, cross point scan areas 1204 and 1208 are determined initially using zone scanning. In addition, two additional cross point scan areas 1220a and 1228a including corresponding false points are also determined initially using zone scanning.

Generally, the cross point scan area is one that minimally encompasses a group of adjacent possible touch locations, which may be initially identified using zone scanning. For example, with reference to FIG. 11, cross point scan area 1204 of FIG. 12 is based upon the group of possible touch locations comprised of 1$^{st}$ contact points 1116 of FIG. 11 and 1$^{st}$ false points 1220, which may be initially identified using zone scanning. Analogously, cross point scan area 1208 of FIG. 12 is comprised of 2$^{nd}$ contact points 1124 of FIG. 11 and 2$^{nd}$ false points 1228, which may be initially identified using zone scanning.

In each case, the cross point scan area comprises a minimal set of cross points that include the adjacent contact points and false/phantom points. Thus, cross point detection as described herein is performed only for the cross points with the determined touch area or areas (as in the embodiments of FIGS. 11 and 12). Using the cross point detection thus identifies actual/real touch locations for a multi-point touch.

In one embodiment, after "real" or actual touch locations are identified in each of cross point scan areas 1204 and 1208 (e.g., shown as including 1$^{st}$ contact points 1116 and 2$^{nd}$ contact points 1124), as well as the cross point scan areas 1220a and 1228a, and phantom or false locations are eliminated from each of them using coarse cross point scanning, fine cross point scanning is performed near the actual touch locations to more precisely map a touch location or shape.

In terms of total efficiency, the combination of zone detection and cross point detection significantly reduces a total number of detection steps in relation to performing cross point detection for all possible touch locations of a touchscreen. In this example, for four actual/real touch locations, 40 zone detection steps are followed by 16 cross point detection steps to accurately identify the 4 actual/real touch locations instead of using 400 cross point detection steps. In one desired application that includes a 20×40 array, which is currently necessary of a 12.1" diagonal touchscreen area, tremendous speed improvements may be achieved, even for a multipoint touch in which ten actual touch locations exist. The total number of scans is equal 20+40=60 (zone scanning) plus 10×10=100 (fine cross point scanning) for a total number of 160 scans. Using only cross point scanning, 20×40=800 scans would have to be performed to identify the ten touch locations. Additionally, while full "zone" scanning is still necessary to detect new touches, testing of data for "real"/ "phantom", can be reduced or is made unnecessary as the real points can be tracked by the firmware. This can greatly reduce overhead testing further over all point testing.

Figure 13:
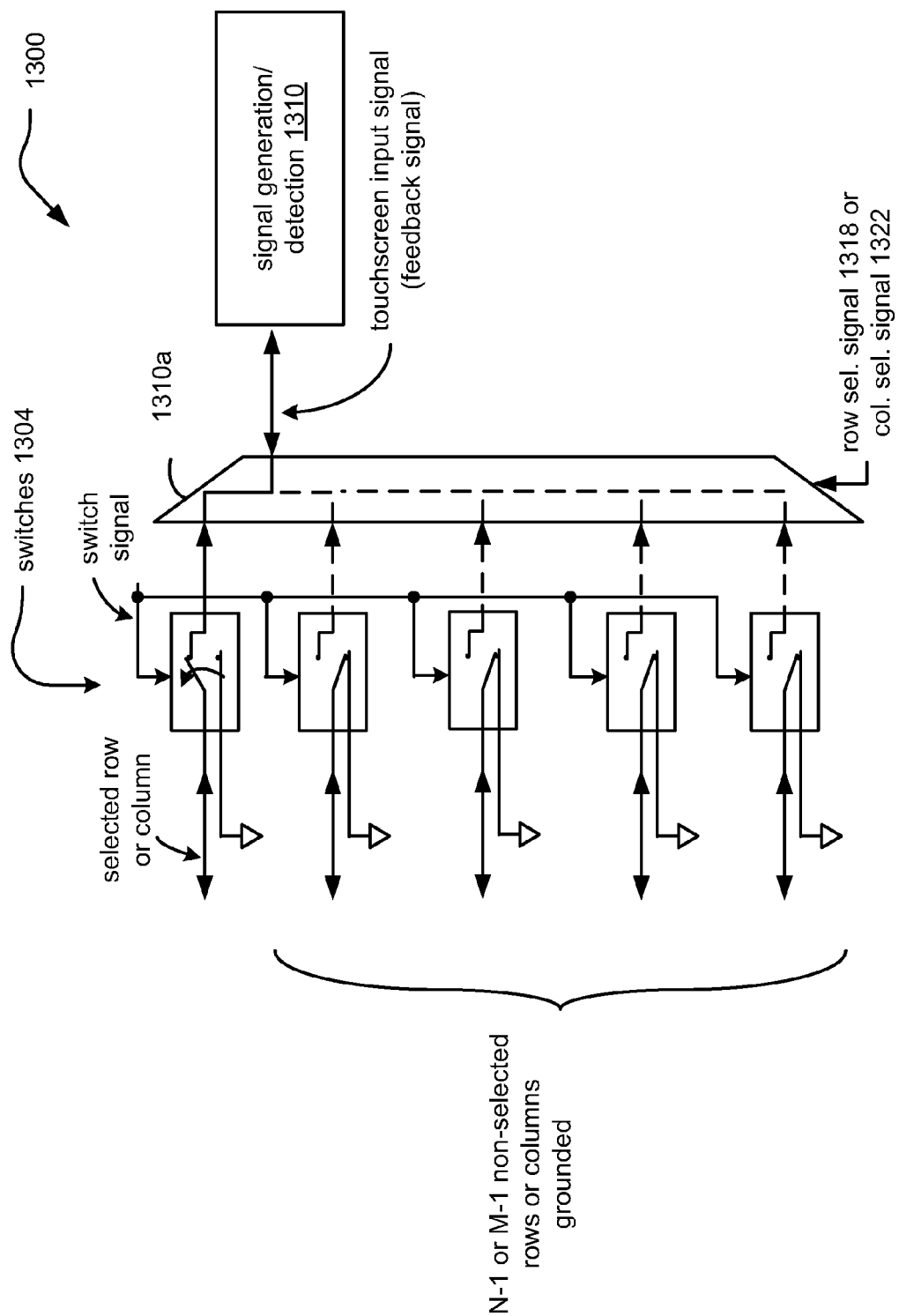
FIG. 13 is a functional block diagram of at least part of a grounding circuitry that grounds all conductors of the plurality of conductors except the first conductor to which the feedback signal is coupled according to one embodiment of the invention.

FIG. 13 is a functional block diagram of at least part of a grounding circuitry that grounds all conductors of the plurality of conductors except the first conductor to which the feedback signal is coupled according to one embodiment of the invention. Generally, a function of circuitry 1300 is to ground all conductors of a group of conductors, e.g., a plurality of first conductors or a plurality of second conductors (rows or columns) except for the one conductor to which a touchscreen input signal is being coupled and/or a response signal is being received for processing at a given time (e.g., by signal generation/detection module 1310). Thus, as may be seen, a MUX 1310a includes a plurality of outputs that are operably coupled by a corresponding plurality of coupling switches 1304 to a corresponding plurality of conductors of the plurality of first or second conductors. More specifically, when a row select signal 1318 or a column select signal 1322 couples a feedback signal (a touchscreen input signal) to a selected row or column, a switch control signal operates to couple the feedback signal to the selected row or column and to decouple a ground or circuit common (collectively, "ground"). In the example shown, the feedback signal drives the switch operation. It should be understood, however, that this diagram is functional in nature. Any switching circuitry that effectively couples the feedback signal to the selected row or column and decouples ground from the selected row or column may be used, while also coupling all non-selected conductors to ground. For example, a control signal generated by circuitry and/or logic operations performed thereby (e.g., processor 944 of FIG. 9) may be used to support such switching operations.

In operation, as may be seen in FIG. 13, the feedback signal (touchscreen input signal) is thus provided to the selected row or column based on row select signal 1318 or column select signal 1322 while the remaining rows or columns (shown as N−1 or M−1 non-selected rows or columns) can remain grounded. Such grounding is beneficial for multiple reasons including blocking/shielding of interference and increase of user to ground impedance.

As shown herein, each switch 1304 is also coupled to ground or circuit common wherein the associated conductor (row or column) is ordinarily coupled to ground or circuit common unless a switch signal is presented to couple the touchscreen input signal to the conductor instead of ground being coupled to the conductor. In the specific example shown, the touchscreen input signal is operably coupled also as the switch signal to prompt corresponding switch 1304 to switch positions to couple the touchscreen input signal to the conductor.

Figure 14:
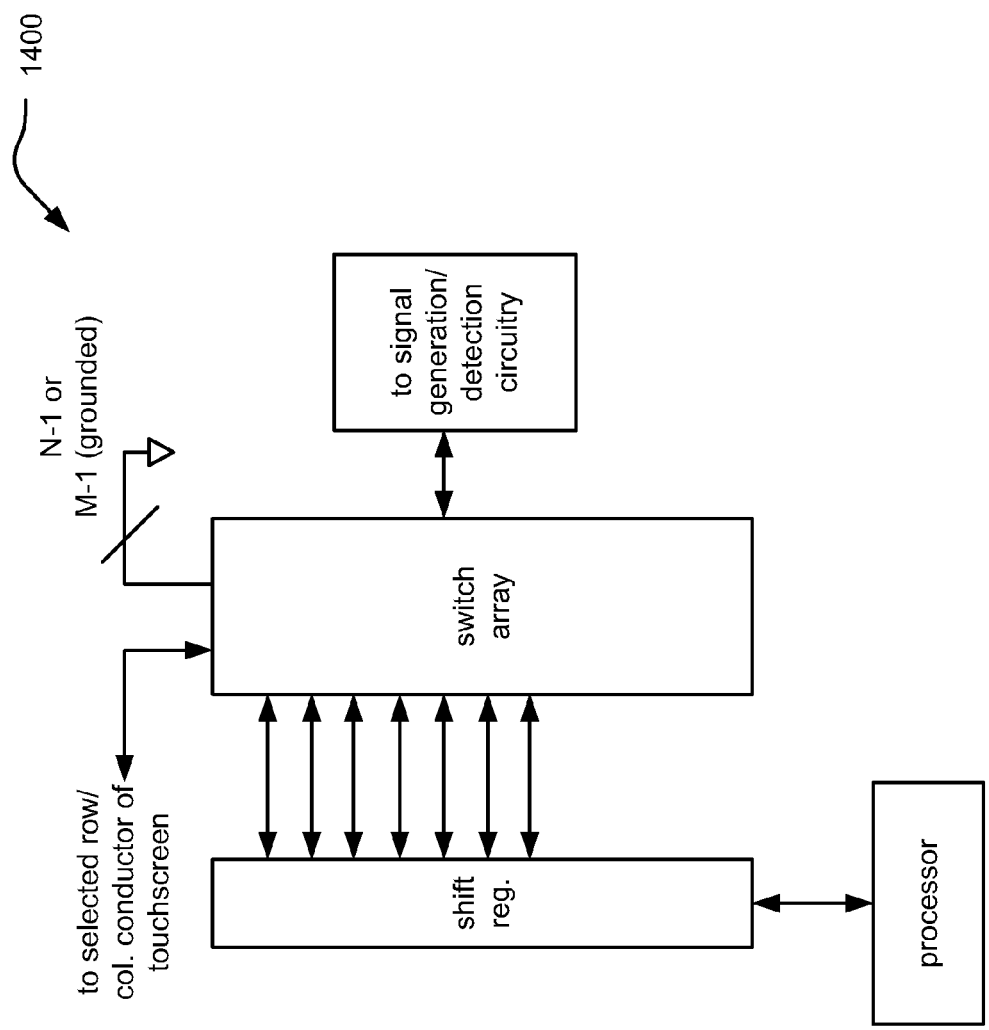
FIG. 14 is a functional block diagram of switching circuitry that may alternatively be used to effectuate appropriate selection/switching of conductors to either a signal generation/detection circuitry or a ground potential level.

FIG. 14 is a functional block diagram 1400 of switching circuitry that may alternatively be used to effectuate appropriate selection/switching of conductors to either a signal generation/detection circuitry or a ground potential level. In the illustrated embodiment, a processor produces a bit stream to a shift register (one for controlling a row of conductors or one for controlling a column of conductors) that couples the bits to a switch array to specify switching for the switch array. The row and column shift registers are separated and the shift outputs are latched. As such, outputs may be set or cleared by setting or changing logic states of the bits in the shift registers to produce a final setup for the row or column and then may be loaded into the shift register while the previous setup is used. In addition, this system allows a scan function with only a few bits and control bits being toggled.

A high output on the shift register, in the described embodiment, will enable connection of the drive circuit to a row or column conductor strip in the described embodiment of the invention. A low output will disable the drive connection and at the same time switch the row or column conductor strip to ground. Any combination of connections can be made for example, no connections, a single connection, parallel connections, cross configurations (rows and columns), parallel cross connections, etc.

The circuitry allows a row or column to be driven with a signal (AC, DC, or combination) while remaining in a low impedance state (via a virtual node). As discussed before, the low impedance state may be maintained while the current flowing into and out of the conductor strip is measured and converted to a voltage with gain. In the described embodiment of the invention, the circuit uses single ended inputs instead of differential paired inputs. In one embodiment, as will be described in greater detail in relation to FIGS. 15A and 15B, the switch array is operated to ground all outputs except a specified output to ground and to couple the specified output to an input. Thus, the touchscreen input signal may be coupled to a conductor through the switch array and may further support signal detection circuitry for a row/column conductor of a touchscreen for zone scanning or cross point scanning while all other conductors are coupled to ground or circuit common.

Figure 15:
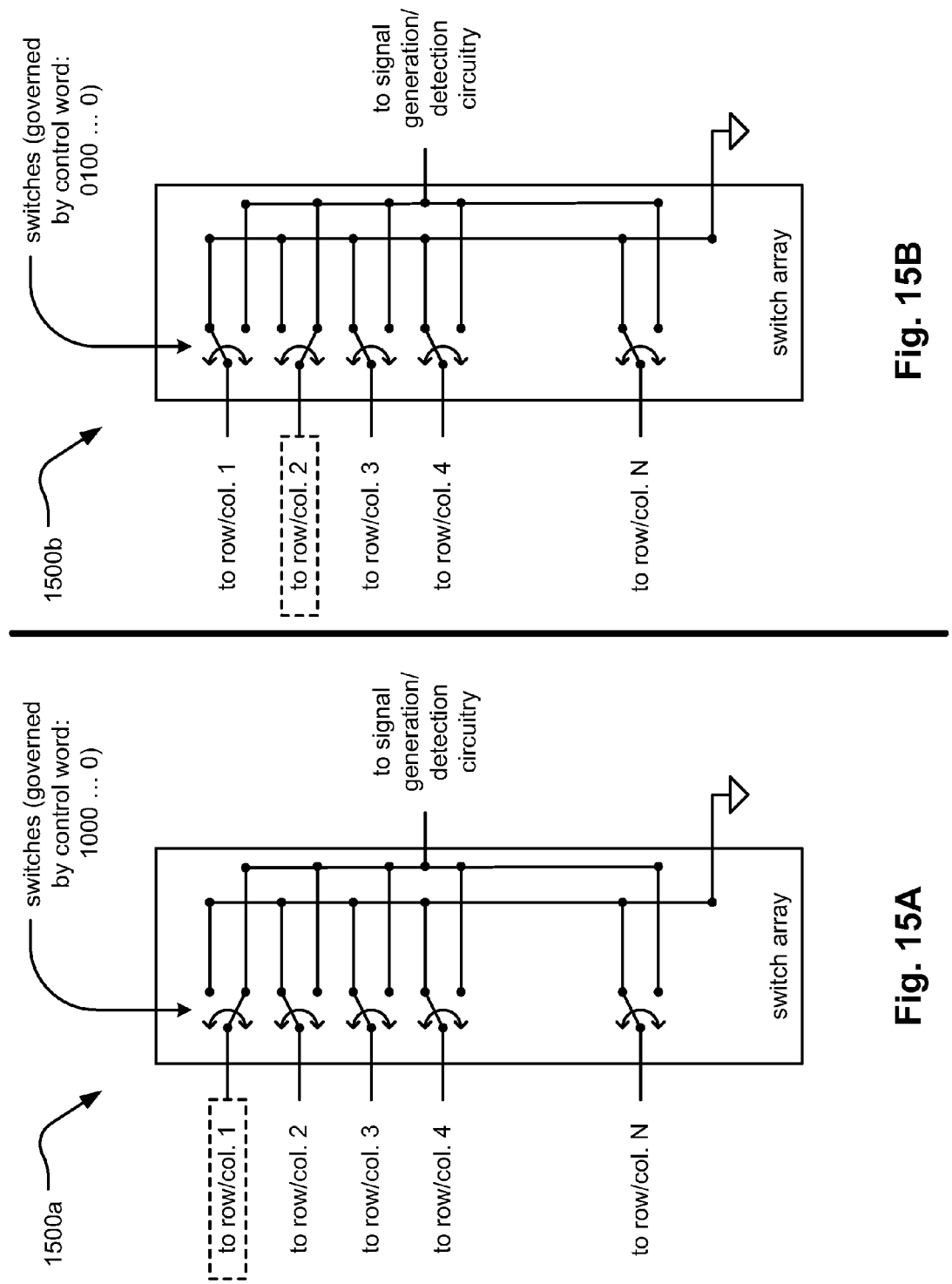
FIGS. 15A and 15B are exemplary diagrams of embodiments switching circuitry.

FIGS. 15A and 15B are exemplary diagrams of embodiments 1500a and 1500b, respectively, of switching circuitry. More specifically, at any given time, all of the conductors are coupled to ground except for one selected conductor. The switch array may be viewed as functionally performing a N:2 MUX operation. In FIG. 15A, the signal generation/detection circuitry is coupled to row or column 1, while all other conductors are coupled to a ground potential level (e.g., 0 Volts). In FIG. 15B, the signal generation/detection circuitry is coupled to row or column 2, while all other conductors are coupled to a ground potential level (e.g., 0 Volts).

If desired, a control word (digital) can govern the connectivity of the switches in the switch array to effectuate this operation. For example, an appropriate control word for effectuating the connectivity of FIG. 15A could be 1000 . . . 0 (to connect the row or column 1), and an appropriate control word for effectuating the connectivity of FIG. 15A could be 0100 . . . 0 (to connect the row or column 2).

Again, in FIG. 15A, it may be seen that row/col. 1 is coupled to signal generation/detection circuitry while all other rows/cols. are coupled to ground. In FIG. 15B, row/col. 2 is coupled to signal generation/detection circuitry while all other rows/cols. are coupled to ground. FIGS. 15A and 15B illustrate a "control word" that drives the switching with the switch array or MUX. It should be understood that this control word, in one embodiment, may provided by the shift register as discussed above and shown in relation to FIG. 14. This control word may easily be provided, alternatively, in any other known form by other circuitry or logic operations depending on a structure and capability of the switch array.

Figure 16:
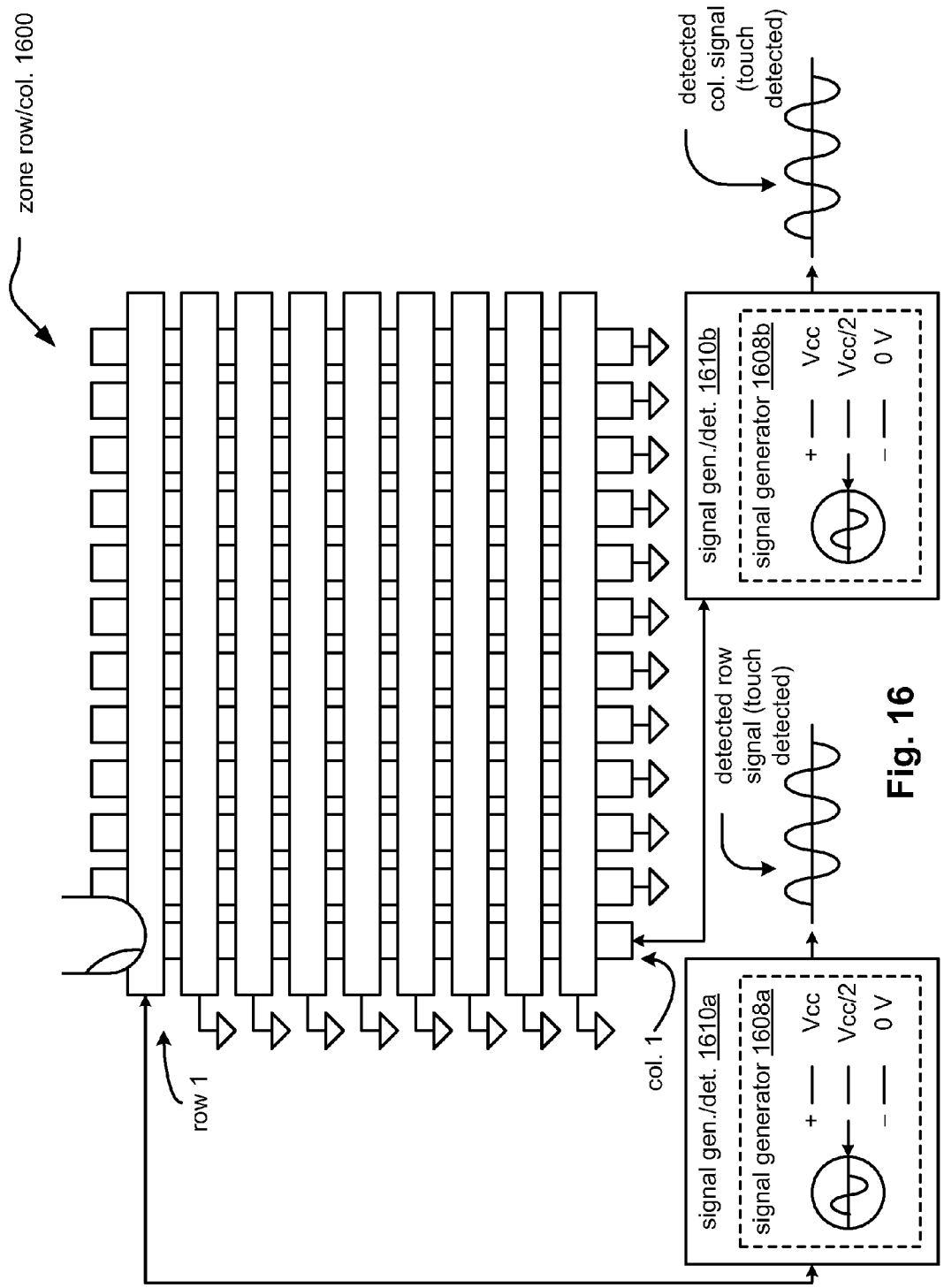
FIGS. 16 and 17 are functional diagrams of a system having row and column conductors that further illustrates operation according to one embodiment of the invention.
Figure 17:
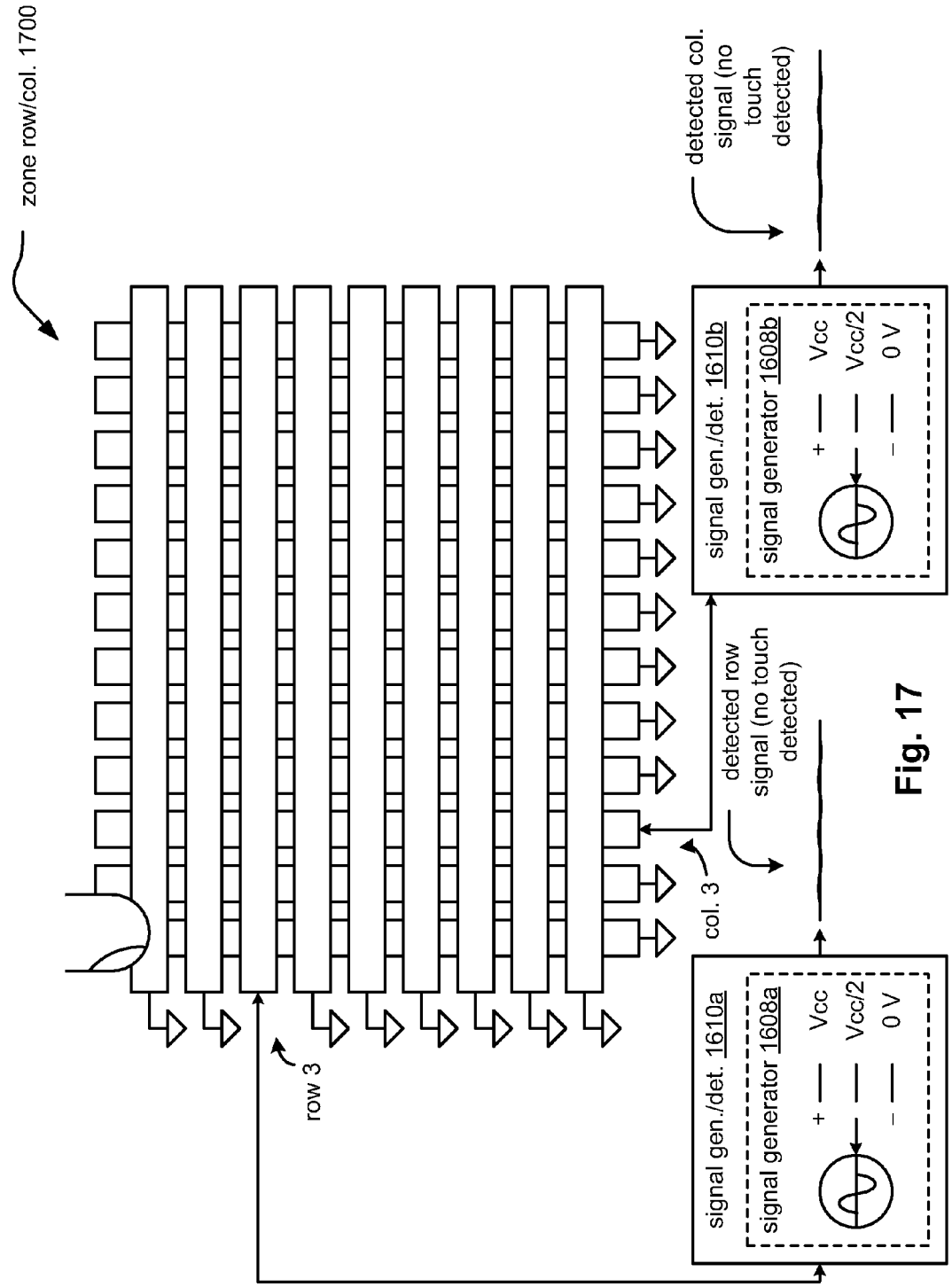

FIGS. 16 and 17 are functional diagrams 1600 and 1700, respectively, of a system having row and column conductors that further illustrates operation according to one embodiment of the invention.

In the embodiment of FIG. 16, a plurality of first conductors oriented as rows are shown disposed over a plurality of second conductors oriented as columns. The system that includes row and column conductors illustrates zone scanning according to one embodiment of the invention. A signal generator 1608a, implemented as part of signal generator/detector 1610a, sequentially and successively provides its corresponding touchscreen input signal to each of row oriented conductors of the touchscreen. A signal generator 1608b, implemented as part of signal generator/detector 1610b, sequentially and successively provides its corresponding touchscreen input signal sequentially to each of the column oriented conductors of the touchscreen. For a touch at the location shown, a response signal is received by signal generator/detector 1610a when row 1 is scanned. Similarly, a response signal is received by signal generator/detector 1610b when column 1 is scanned. Generally, for zone scanning/detection, zone scanning is performed to detect a touch as described, for example, in relation to FIGS. 8A and 8B above. The response signal is shown here to that includes the $IR_{touch}$ component described in relation to FIGS. 8A, 8B, and 8C. In the embodiment of FIG. 17, it may be seen that the response signal for row 3 and col. 3 are essentially flat (no response signal after subtraction of input signal, with perhaps only some minor noise component therein) to indicate no touch being detected.

Figure 18:
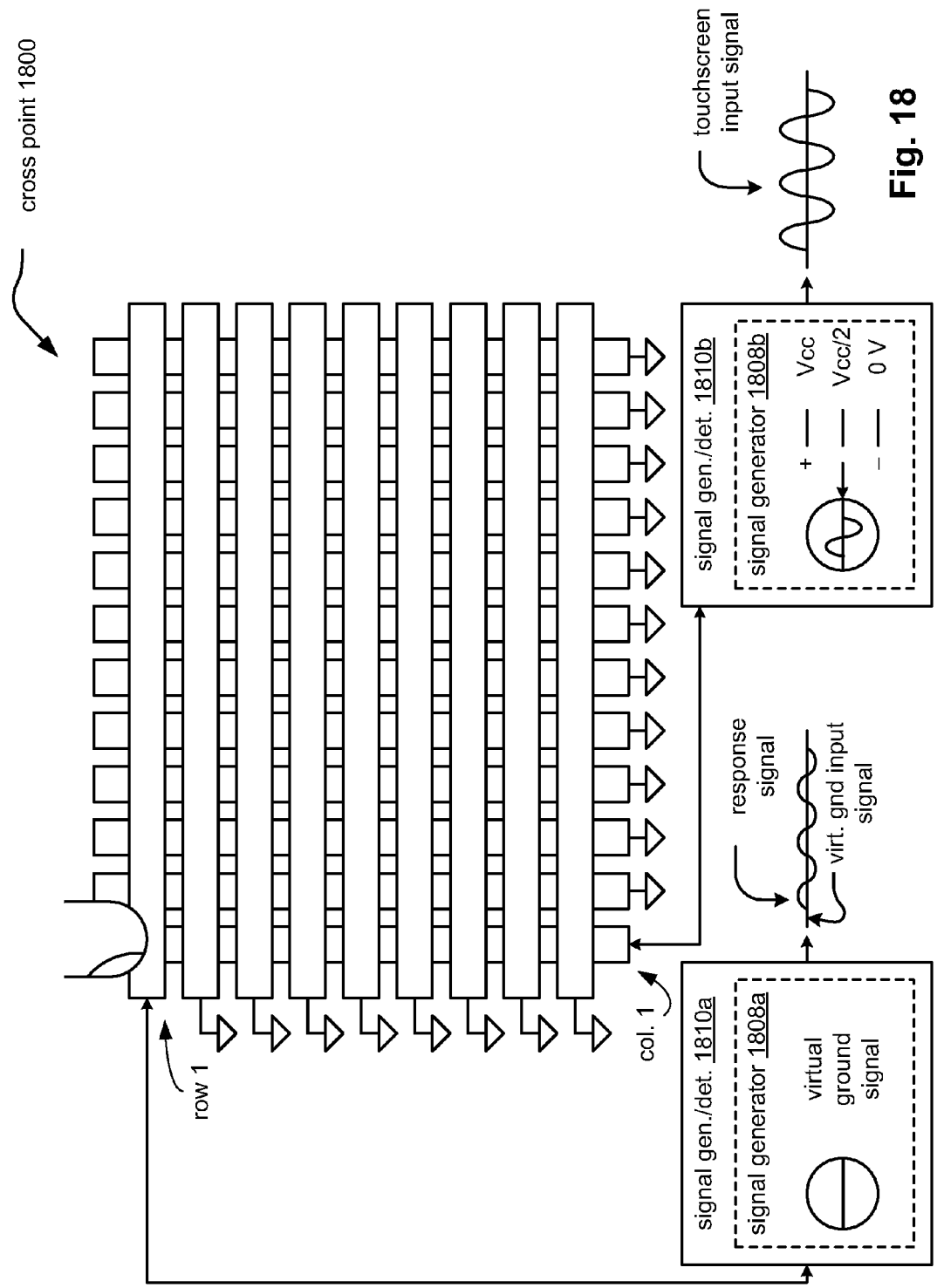
FIG. 18 is a functional diagram of a system having row and column conductors that further illustrates cross point scanning.

FIG. 18 is a functional diagram 1800 of a system having row and column conductors that further illustrates cross point scanning. In the embodiment of FIG. 18, a plurality of first conductors oriented as rows are shown disposed over a plurality of second conductors oriented as columns. The system that includes row and column conductors shown illustrates cross point scanning according to one embodiment of the invention. As may be seen, signal generator 1808a, implemented as part of signal generator/detector 1810a, and signal generator 1808b, implemented as part of signal generator/detector 1810b, are coupled to produce touchscreen input signals to row and column conductors, respectively, and to receive response signals from the row/column conductors. Here, signal generator/detector 1810b provides a touchscreen input signal sequentially to at least one of the column oriented conductors of the touchscreen.

A signal generator/detector 1810a receives a response signal from at least one row oriented conductor of the touchscreen. For a touch at the location shown, a response signal is received by signal generator/detector 1810a when row 1 is scanned when a touchscreen input signal is being provided to a column (here, col. 1) by signal generator/detector 1810b. Generally, for cross point scanning, a user's touch capacitively couples first to the column conductor (here, col. 1) and then to the row conductor (here, row 1) to effectively form a bridge to allow the touchscreen signal provided onto col. 1 by signal generator 1808b to couple to the row conductor for detection by signal generator/detector 1810a. Any capacitive coupling to a row conductor not receiving a touchscreen input signal (and thus not being scanned) results in associated signals being conducted to ground to eliminate the effects of such coupling. The response signal is shown here to that includes an $IR_{touch}$ component similar to that described in relation to FIGS. 8A and 8B.

It is noted that the output of signal generation/detector 1810a contains the column "zone" signal level during cross point scanning. This level can be monitored for changes during a cross point scan. If the "zone" energy level of the column is baseline, then cross point scanning is not needed as there is no touch.

Figure 19:
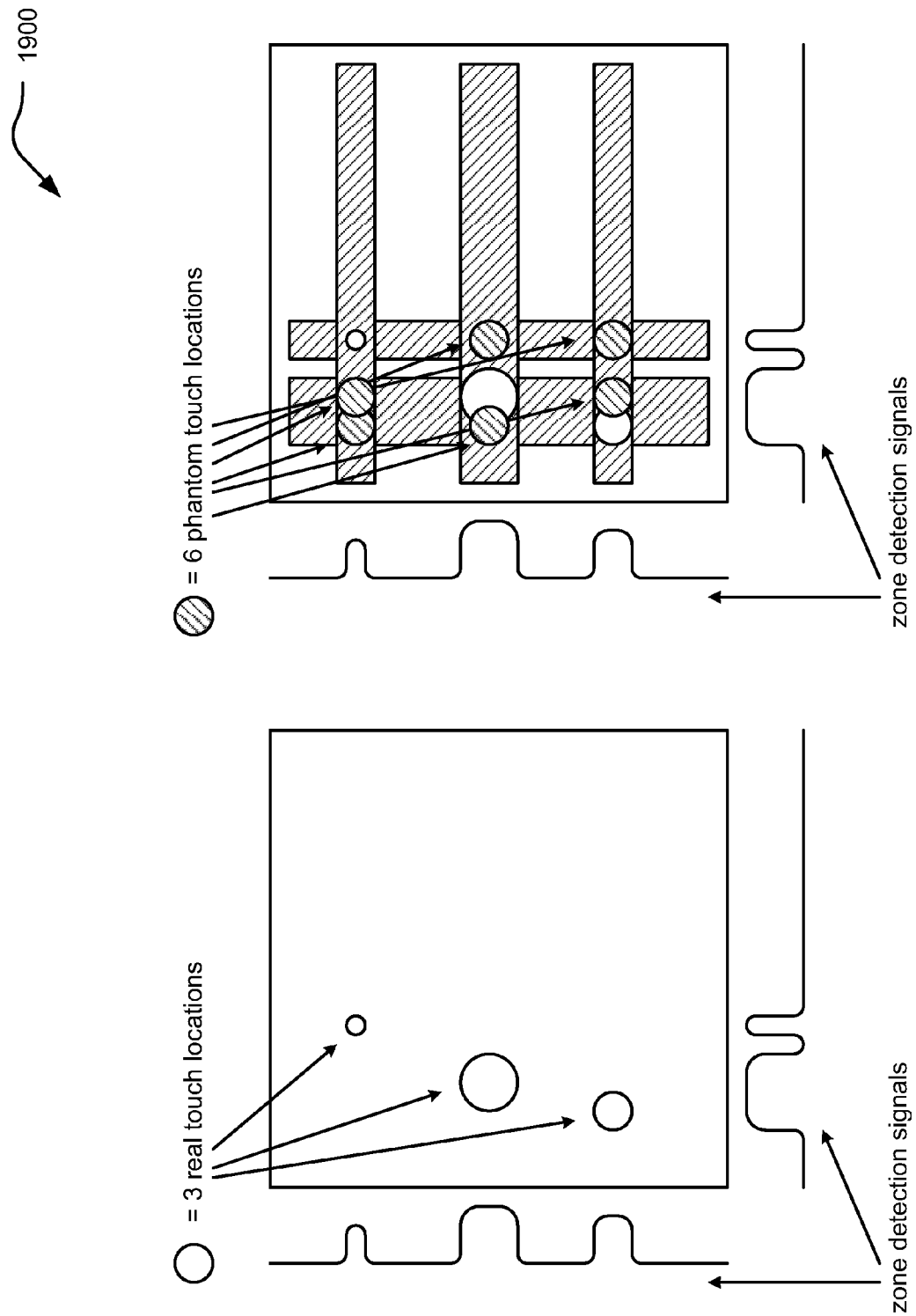
FIG. 19 is a functional diagram that illustrates identified possible touch locations that includes actual or real touch locations as well as phantom or false touch locations.

FIG. 19 is a functional diagram 1900 that illustrates identified possible touch locations that includes actual or real touch locations as well as phantom or false touch locations. As may be seen on the left hand side, three actual touch locations are identified along with six phantom touch locations on the right hand side of the FIG. 19 when zone scanning is utilized. As may further be seen, one of the real touch locations is substantially larger than the other touch locations (e.g., comparing the size of a thumb to the smallest/last finger of a person's hand). Using fine cross point scanning and, optionally, interpolation, an accurate mapping of the touch locations may be identified for a specified cross point scan area as discussed in relation to FIGS. 11 and 12.

Generally, cross point scanning is performed for an area based on all of the phantom and real/actual touch locations. Here, three actual/real touch locations produce a total of nine regions to be tested, and because some of them are relatively close together, there results in a total of six regions to be tested.

Again, while the embodiments of the FIG. 16, FIG. 17, and FIG. 18 employ conductors having rectangular shape, it is noted that any desired shapes, widths, etc. of the various conductors of a touchscreen may employed without departing from the scope and spirit of the invention.

Figure 20:
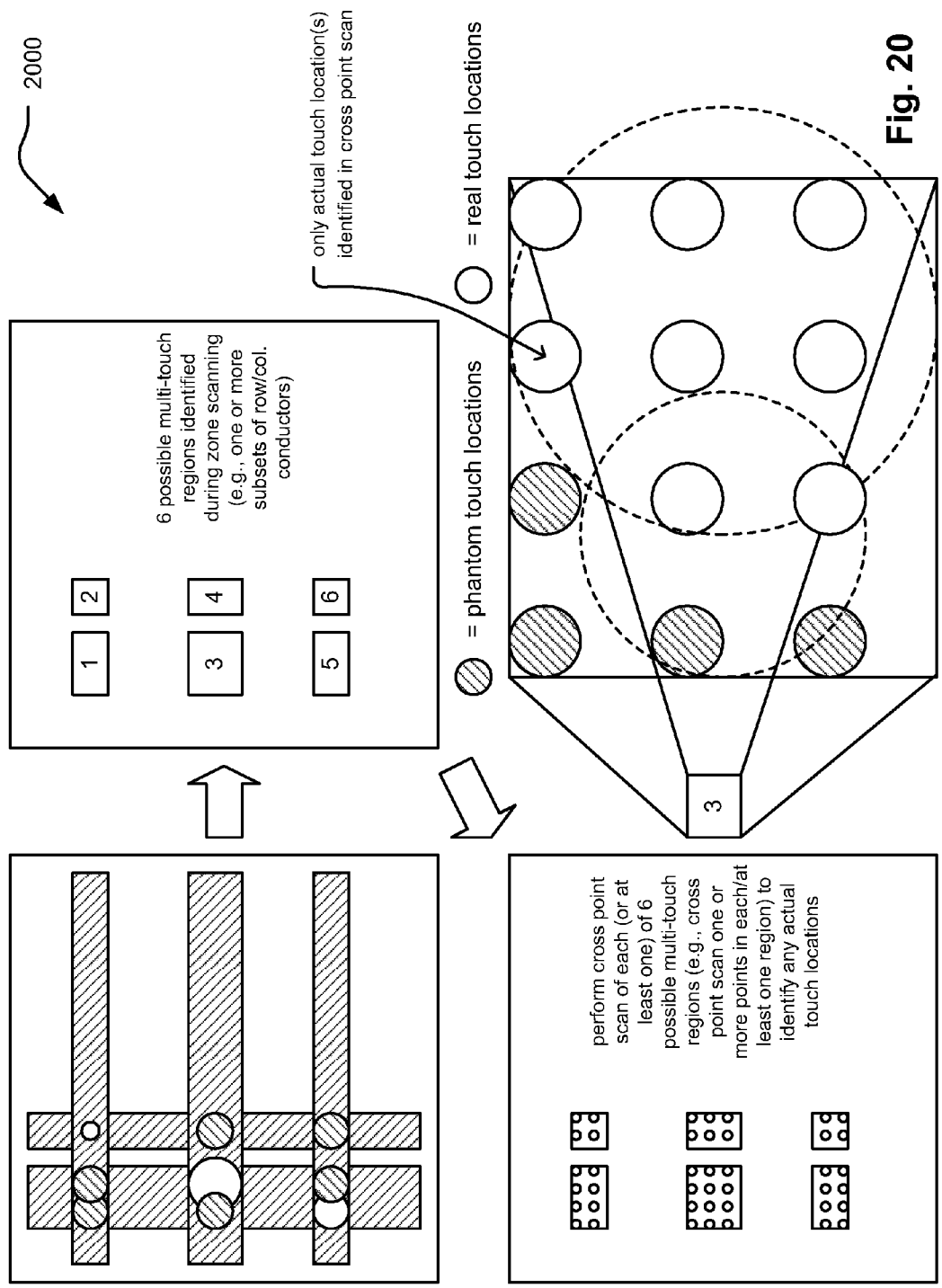
FIG. 20 is a functional diagram that illustrates possible multi-touch regions identified during zone scanning for which cross point scanning may be performed.

FIG. 20 is a functional diagram 2000 that illustrates possible multi-touch regions identified during zone scanning for which cross point scanning may be performed. With reference to the previous diagram, there are 6 possible multi-touch regions identified during the zone scanning performed for the touchscreen. The zone scanning may be employed to identify a subset of row and/or column conductors to be further monitored in an effort to identify actual touch locations. The zone scanning may be viewed as performing the identification of these possible multi-touch regions to identify a subset of the total touchscreen area to be further monitored (e.g., using cross point scanning and/or a combination of cross point scanning with zone scanning).

Moreover, once a possible multi-touch region is identified, a predetermined number of locations or points (e.g., as defined by the intersections of row and column conductors) may be further monitored such as by using cross point scanning. For example, when a possible multi-touch region is identified a region composed of a predetermined number of locations or points of the touchscreen may be monitored in the vicinity of that region (e.g., either one point/location within the region, all points/locations within the region, a predetermined number of points/locations within the region such as a n×m region that includes n rows and m columns that define the n×m region, etc.). There are a variety of means by which a plurality of possible multi-touch regions may be identified and the subsequent cross point scanning of one or more of them (including one or more points/locations within each multi-touch region) may be performed without departing from the scope and spirit of the invention.

Then, once any possible multi-touch regions are identified, cross point scanning may be performed for at least one location (e.g., intersection of a row and column conductor) within each identified multi-touch region. If desired, more than one location with each possible multi-touch region, or as few as only one location, may also be cross point scanned without departing from the scope and spirit of the invention. Considering the lower left hand portion of the diagram, it can be seen that there may be multiple locations (e.g., intersections of row and column conductors) within each possible multi-touch region.

Again, each location or point within each possible multi-touch region may be viewed as an intersection of one row conductor and one column conductor. An expanded view of the multi-touch region numbered 3 is depicted in the lower right hand portion of the diagram (i.e., the upper right hand portion of the diagram shows the numbering of the various possible multi-touch regions). As can be seen in the lower right hand portion of the diagram, only those locations or points associated with a real/actual touch location will indicate such during the cross point scanning.

Figure 21:
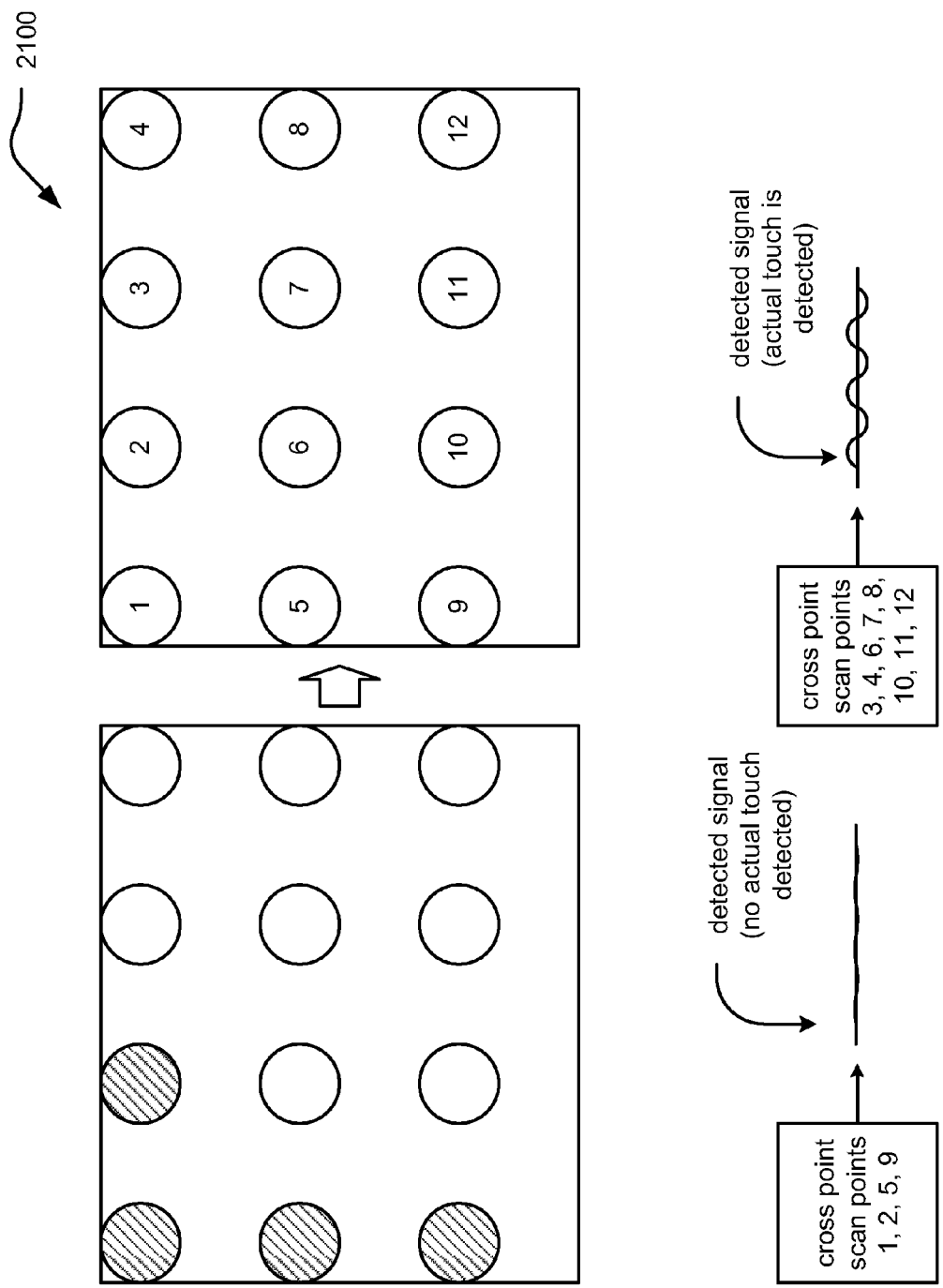
FIG. 21 is a functional diagram that illustrates the detected signals for each of real/actual and phantom touch locations.

FIG. 21 is a functional diagram 2100 that illustrates the detected signals for each of real/actual and phantom touch locations. With reference to the previous two diagrams, again, only those locations or points associated with a real/actual touch location will indicate such during the cross point scanning. This diagram also employs the multi-touch region numbered 3 from the previous diagrams for illustration.

Considering the upper right hand portion of the diagram, it shows the numbering of the various locations or points within multi-touch region numbered 3. The resulting cross point scan signal detected when cross point scanning the points/locations numbered 1, 2, 5, and 9 will indicate no actual touch detected. However, the resulting cross point scan signal detected when cross point scanning the points/locations numbered 3, 4, 6, 7, 8, 10, 11, and 12 will indicate that an actual touch is detected.

With respect to each of the zone scanning and/or cross point scanning described herein, it is noted that any of a wide variety of scanning sequences may be performed. For example, when performing zone scanning such as in accordance with FIG. 16 and FIG. 17, the zone scanning can operate sequentially through all columns and then sequentially through all rows and then continue back sequentially through all columns, and so on. If desired, signals of different frequencies may be provided to rows and columns simultaneously. For example, a first signal having a first frequency may be provided sequentially to all columns while a second signal having a second frequency may be provided sequentially to all rows.

Similarly, cross point scanning may be performed on a point/location by point/location basis such that only one point/location is cross point scanned at a given time. Alternatively, a first signal having a first frequency may be employed to perform cross point scanning of a first point/location while a second signal having a second frequency may be employed to perform cross point scanning of a second point/location. It is noted that additional signal/detection circuitry is employed to perform cross point scanning of multiple points during a same time period. Clearly, each of these various possible embodiments includes some coordination and timing management to effectuate appropriate scanning of the touchscreen.

Figures 22A, 22B:
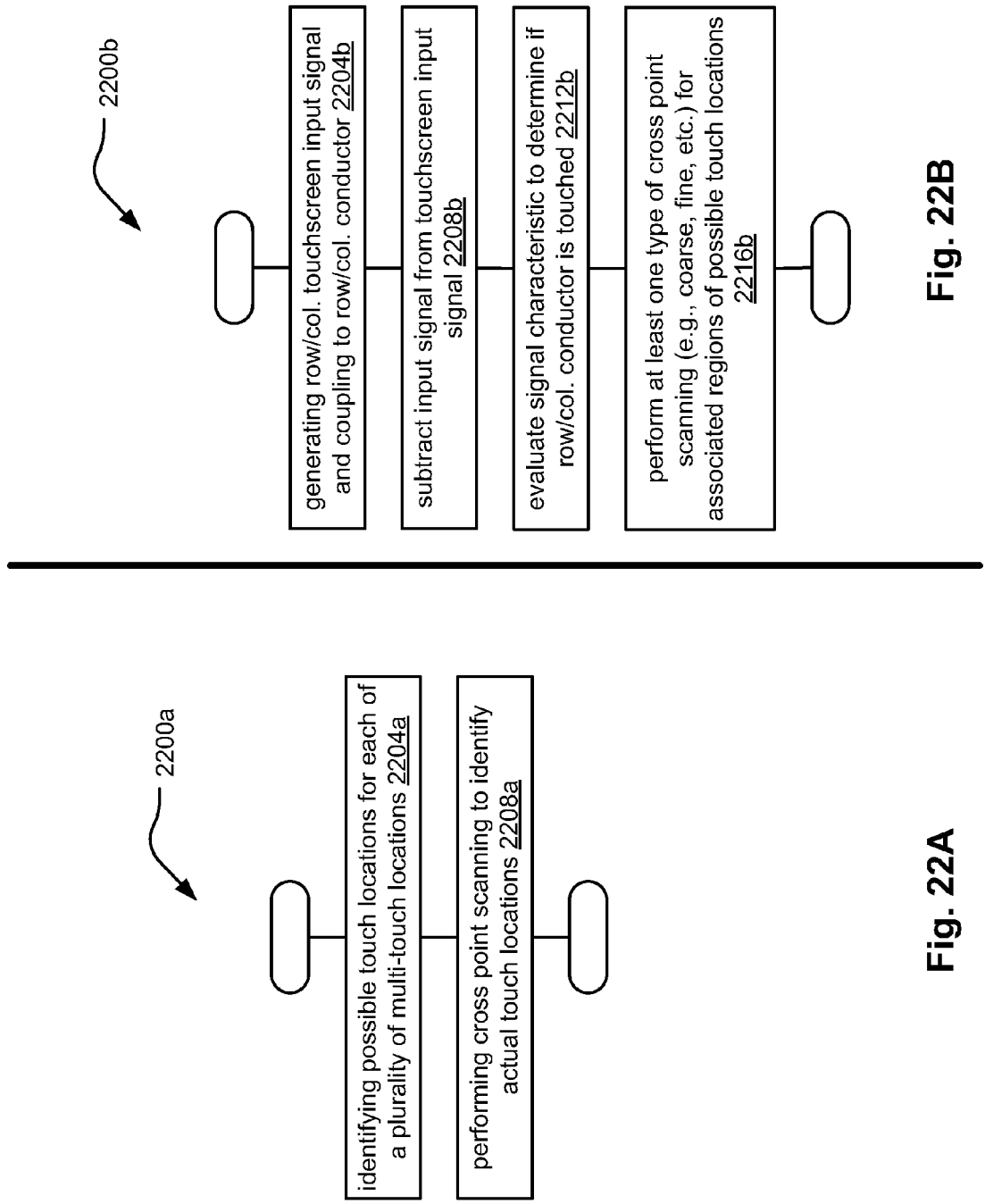
FIG. 22A is a flow chart that illustrates a method for identifying touch locations for a multi-touch according to one embodiment of the invention.
FIG. 22B is a flow chart illustrating method for detecting at least one touch location of a touchscreen.

FIG. 22A is a flow chart that illustrates a method 2200a for identifying touch locations for a multi-touch according to one embodiment of the invention. The method 2200a begins with identifying possible touch locations for each of a plurality of multi-touch locations, as shown in a block 2204a. This includes performing row zone scanning of a plurality of first conductors aligned in a first direction in a touchscreen, performing column zone scanning of a plurality of second conductors aligned in a second direction in the touchscreen, and identifying a plurality of possible multi-touch locations corresponding to a user's interaction with the touchscreen based on the row zone scanning and the column zone scanning.

Thereafter, the method 2200a includes performing cross point scanning of at least one of the plurality of possible multi-touch locations, based on the plurality of possible multi-touch locations identified, to identify at least one actual touch location corresponding to the user's interaction with the touchscreen, as shown in a block 2208a.

For a multi-touch, in which there are two or more actual touch locations, zone detection steps (including zone scanning of rows and zone scanning of columns), two false locations would be identified if the actual touches were not axially aligned with one of the touched conductors. Thus, the method includes performing cross point scanning for the identified possible touch locations (in an area defined by the possible touch locations).

Performing cross point scanning can involve performing multiple cross point scan iterations. For example, in one embodiment of the invention, a coarse cross point scan is performed to better define a touch area. Thereafter, based on internal logic, a fine cross point scan (e.g., the fine cross point scan being relatively finer than the coarse cross point scan previously performed) is performed to identify all actual touch locations corresponding to the user's interaction with the touchscreen. Additionally, in one embodiment, either coarse or fine cross point scanning can include scanning to interpolate touch locations for adjacent and axially aligned first or second conductors as interpolation has been described herein.

FIG. 22B is a flow chart illustrating method 2200b for detecting at least one touch location of a touchscreen. The method includes generating and coupling a touchscreen input signal to a first conductor of the plurality of first conductors or to a second conductor of a plurality of second conductors, as shown in a block 2204b, and detecting a change in the signal caused by the user's interaction with the touchscreen. Detecting a change in the signal caused by the user's interaction with the touchscreen includes subtracting an input signal from the touchscreen input signal, as shown in a block 2208b, and evaluating a signal characteristic to determine if a corresponding conductor (e.g., a first or second conductor) is being touched, as shown in a block 2212b.

Detecting a change comprises, in one embodiment, subtracting an input signal from a touchscreen input signal to identify a signal component (e.g., $IR_{touch}$) wherein the signal component is based on a signal response caused by a touch. Thereafter, the method includes performing at least one type of cross point scanning (detection) for associated touch areas for the possible touch locations, as shown in a block 2216b.

Generally, cross point scanning includes coupling a first signal to a first conductor of the plurality of first conductors and detecting a second or response signal in a second conductor of the plurality of second conductors resulting from the user's interaction with the touchscreen. Traditionally, cross point detection includes a physical coupling between column and row oriented conductors. Here, however, capacitive coupling is utilized. Such capacitive coupling may be utilized at least partially because of shielding that is provided by lower layer conductors (that are not shaped and/or sized the same as the upper layer conductors and, in the described embodiments, largely cover an active surface area of a touchscreen. Additionally, the grounding of conductors to ground, circuit common or virtual ground helps reduce interference and undesired capacitive coupling. When the back conductors are formed in a continuous manner without spaces or windows, then only the back conductors will capacitively couple to the LCD (disposed below the back or lower layer conductors) and only the back conductors will have parasitic capacitance to the LCD. The top conductors will have parasitic capacitance and/or capacitive coupling only to the back conductors.

For cross point scanning, in the described embodiment, the plurality of first conductors is the back conductors or lower layer conductors, which, here, are arranged in columns. Determining the touch location includes identifying an intersection of the first conductor and the second conductor that corresponds to the touch location based on the user's interaction with the touchscreen. Typically, in the described embodiments, cross point scanning is performed either subsequent to zone scanning or upon a changed condition in a signal response to indicate touch or touch movement has occurred.

The zone detection includes zone scanning rows and columns and identifying a plurality of possible touch locations corresponding to a user's interaction with the touchscreen for each of a plurality of multi-touch locations. The efficient scanning methods for detecting a plurality of touch locations for a multi-point touch thus includes performing zone scanning for the rows and columns and then performing cross point scanning for each of the plurality of possible multi-touch locations (or at least one of the plurality of possible multi-touch locations) to identify a plurality of actual touch locations of the plurality of possible multi-touch locations. As described before, the plurality of possible multi-touch locations may include actual touch locations and false locations.

Figure 23:
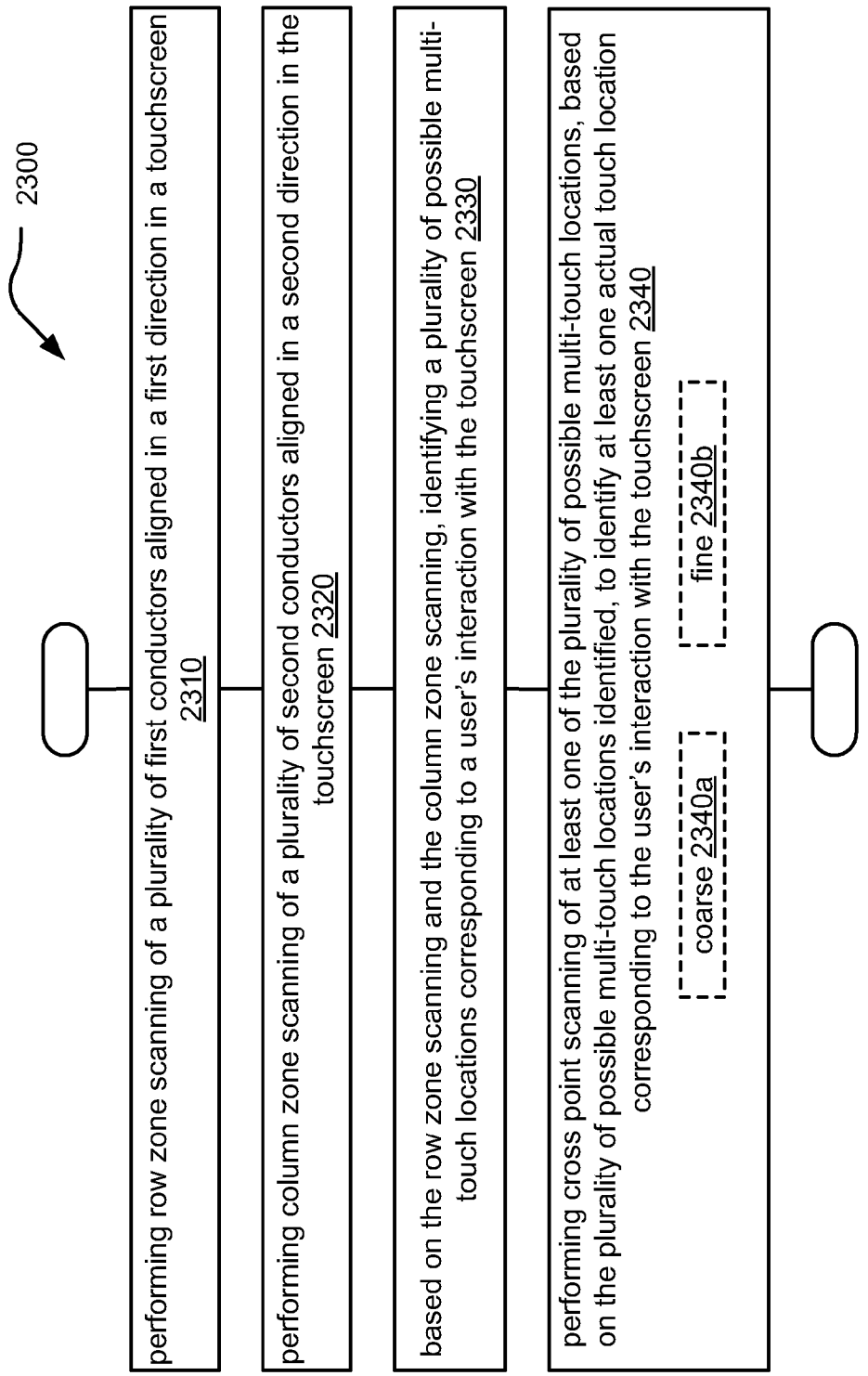
FIG. 23 is a flow chart illustrating a method for detecting at least one touch location of a touchscreen.

FIG. 23 is a flow chart illustrating a method 2300 for detecting at least one touch location of a touchscreen. The method 2300 includes performing row zone scanning of a plurality of first conductors aligned in a first direction in a touchscreen, as shown in a block 2310. Thereafter, the method 2300 includes performing column zone scanning of a plurality of second conductors aligned in a second direction in the touchscreen, as shown in a block 2320. Based on the row zone scanning and the column zone scanning, the method 2300 includes identifying a plurality of possible multi-touch locations corresponding to a user's interaction with the touchscreen, as shown in a block 2330.

Finally, the method 2300 includes performing cross point scanning of at least one of the plurality of possible multi-touch locations, based on the plurality of possible multi-touch locations identified, to identify at least one actual touch location corresponding to the user's interaction with the touchscreen, as shown in a block 2340. Performing cross point scanning for touch detection can include any one or combination of coarse cross point scanning, as shown in block 2340*a* or fine cross point scanning, as shown in a block 2340*b*. As one example, the coarse cross point scanning may involve scanning every n-th cross point (where n is an integer), and the fine cross point scanning may involve scanning every n/m-th cross point (where n/m is also an integer and such that the fine cross point scanning scans more cross points than the coarse cross point scanning).

In coarse cross point scanning, a subset of possible touch locations is selected in a cross point scan area (e.g., in the areas 1-6 of FIG. 20). In fine cross point scanning, a relatively greater number of possible touch locations within that same cross point scan area are searched to provide greater touch identification (resolution). The greater number can include all of the possible touch locations in the cross point scan area (not already searched) or a subset of the possible touch locations wherein the subset has a greater number of possible touch locations that are scanned in relation to the coarse cross point scanning.

It is also noted that in any of the various zone or cross point scanning embodiments described herein, various signal processing schemes including oversampling (e.g., re-sampling a same location more than once) may be performed without departing from the scope and spirit of the invention.

As one of average skill in the art will appreciate, the terms "substantial", "substantially", "approximate", "approximately", and/or variants thereof, as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, thermal noise, and/or other parameters. Moreover, references substantially covering an active surface area of a touchscreen can be as much as that which is allowed by the processing and manufacturing means employed to make the touchscreen (i.e., placing adjacent conductors as close to one another as possible using such means). In one embodiment, the closest that conductors are placed together is 40 microns using one presently available technology.

It is noted that the various modules (e.g., signal generation modules, signal detection modules, combined signal generation/detection modules, response signal processing modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus, comprising:
   a conductor pattern including a plurality of first conductors disposed in a first direction and a plurality of second conductors disposed in a second direction different from the first direction;
   a first circuit for detecting first response signals produced by each of the plurality of first conductors to identify a first identified conductor of the plurality of first conductors;
   a second circuit for detecting second response signals produced by each of the plurality of second conductors to identify a second identified conductor of the plurality of second conductors, an intersection between the first identified conductor and the second identified conductor corresponding to a possible location of a user's interaction with the conductor pattern; and
   a signal processing circuit for receiving a select response signal from the second identified conductor produced in response to a select input signal applied to the first identified conductor, the select input signal being applied to the first identified conductor after the possible location is identified, the select response signal being used to determine whether the possible location is an actual location of the user's interaction with the conductor pattern.

2. The apparatus of claim 1, wherein:
   the first circuit includes a first signal generating circuit for generating and sequentially applying first input signals to the plurality of first conductors and for generating the select input signal;
   the first circuit includes a first signal detecting circuit for detecting the first response signals produced in response to the first input signals;
   the second circuit includes a second signal generating circuit for generating and sequentially applying second input signals to the plurality of second conductors; and
   the second circuit includes a second signal detecting circuit for detecting the second response signals produced in response to the second input signals and for detecting the select response signal and providing the select response signal to the signal processing circuit.

3. The apparatus of claim 1, further comprising:
   a first signal selecting circuit for selectively connecting the first circuit to the plurality of first conductors; and
   a second signal selecting circuit for selectively connecting the second circuit to the plurality of second conductors.

4. The apparatus of claim 1, wherein the first circuit includes the second circuit and further comprising:
   a signal selecting circuit for selectively connecting the first circuit to the plurality of first conductors and the plurality of second conductors.

5. The apparatus of claim 1, wherein:
   the first circuit further detects first signal components in the first response signals and provides the first signal components to the signal processing circuit;
   the second circuit detects second signal components in the second response signals and provides the second signal components to the signal processing circuit; and
   the signal processing circuit identifies the first identified conductor using the first signal components and the second identified conductor using the second signal components.

6. The apparatus of claim 1, wherein:
   the first circuit applies the select input signal to the first identified conductor during a cross-point scanning operation; and
   the first circuit skips a predetermined number of the plurality of first conductors during the cross-point scanning operation.

7. The apparatus of claim 1, wherein the first circuit includes:
   a first amplification circuitry that, based on a generated signal and a detection signal corresponding to one of the first response signals, generates an output signal and a feedback signal, wherein the feedback signal is coupled to at least one first conductor of the plurality of first conductors; and
   a second amplification circuitry that produces a difference signal based on a difference between the generated signal and the output signal, wherein the difference signal corresponds to signal components within the detection signal.

8. The apparatus of claim 7, further comprising:
   a signal selecting circuit for selectively coupling the feedback signal to the at least one first conductor and for coupling other ones of the plurality of first conductors except for the at least one first conductor to a predetermined electric potential.

9. The apparatus of claim 7, wherein the second circuit includes:
   a third amplification circuitry that, based on an additional generated signal and an additional detection signal corresponding to one of the second response signals, generates an additional output signal and an additional feedback signal, wherein the additional feedback signal is coupled to at least one of the plurality of second conductors; and
   a fourth amplification circuitry that produces an additional difference signal based on a difference between the additional generated signal and the additional output signal, wherein the additional difference signal corresponds to signal components within the additional detection signal.

10. The apparatus of claim 9, further comprising:
    an additional signal selecting circuit for selectively coupling the additional feedback signal to the at least one second conductor and for coupling other ones of the plurality of second conductors except for the at least one second conductor to a predetermined electric potential.

11. The apparatus of claim 9, wherein the signal processing circuit is coupled to the second amplification circuitry and the fourth amplification circuitry to receive the signal components and identify the possible location based on the signal components.

12. The apparatus of claim 11, further comprising:
a signal selecting circuit for selectively coupling the signal components corresponding to one of the difference signal and the additional difference signal to the signal processing circuit.

13. The apparatus of claim 1, wherein the signal processing circuit further receives at least one additional select response signal associated with at least one additional possible location of the user's interaction with the conductor pattern and determines at least one actual location of the user's interaction with the conductor pattern from the possible location and the at least one additional possible location.

14. The apparatus of claim 13, wherein:
at least one of the possible location and the at least one additional possible location corresponds to a phantom location; and
the signal processing circuit further prevents the phantom location from being considered one of the at least one actual location.

15. A method, comprising:
detecting, by a first circuit, first response signals produced by each of a plurality of first conductors of a conductor pattern to identify a first identified conductor of the plurality of first conductors, the plurality of first conductors being disposed in a first direction;
detecting, by a second circuit, second response signals produced by each of a plurality of second conductors of the conductor pattern to identify a second identified conductor of the plurality of second conductors, the plurality of second conductors being disposed in a second direction different from the first direction;
identifying, by a signal processing circuit, an intersection between the first identified conductor and the second identified conductor as corresponding to a possible location of a user's interaction with the conductor pattern; and
after identifying the possible location, receiving, by the signal processing circuit, a select response signal from the second identified conductor produced in response to a select input signal applied to the first identified conductor to determine whether the possible location is an actual location of the user's interaction with the conductor pattern.

16. The method of claim 15, further comprising:
generating and sequentially applying first input signals to the plurality of first conductors, the first response signals being produced in response to the first input signals; and
generating and sequentially applying second input signals to the plurality of second conductors, the second response signals being produced in response to the second input signals.

17. The method of claim 15, further comprising:
selectively connecting the first circuit to the plurality of first conductors; and
selectively connecting the second circuit to the plurality of second conductors.

18. The method of claim 15, wherein the first circuit includes the second circuit and further comprising:
selectively connecting the first circuit to the plurality of first conductors and the plurality of second conductors.

19. The method of claim 15, further comprising:
detecting, by the first circuit, first signal components in the first response signals;
providing the first signal components to the signal processing circuit;
detecting, by the second circuit, second signal components in the second response signals;
providing the second signal components to the signal processing circuit;
identifying, by the signal processing circuit, the first identified conductor using the first signal components; and
identifying, by the signal processing circuit, the second identified conductor using the second signal components.

20. The method of claim 15, further comprising:
applying, by the first circuit, the select input signal to the first identified conductor during a cross-point scanning operation; and
skipping, by the first circuit, a predetermined number of the plurality of first conductors during the cross-point scanning operation.

21. The method of claim 15, further comprising:
receiving, by the signal processing circuit, at least one additional select response signal associated with at least one additional possible location of the user's interaction with the conductor pattern; and
determining, by the signal processing circuit, at least one actual location of the user's interaction with the conductor pattern from the possible location and the at least one additional possible location.

22. The method of claim 21, wherein at least one of the possible location and the at least one additional possible location corresponds to a phantom location, and further comprising:
preventing, by the signal processing circuit, the phantom location from being considered one of the at least one actual location.

23. The method of claim 21, wherein the possible location and the at least one additional possible location are possible multi-touch locations, and further comprising:
performing a coarse cross point scanning of the possible multi-touch locations to identify a first plurality of actual locations corresponding to the user's interaction with the conductor pattern; and
performing a fine cross point scanning of the first plurality of actual locations to identify a second plurality of actual locations corresponding to the user's interaction with the conductor pattern.

24. The method of claim 23, wherein:
the performing coarse cross point scanning of at least one of the possible multi-touch locations includes resolving at least two possible multi-touch locations of the as the first plurality of actual locations.

25. The method of claim 23, wherein:
the performing the fine cross point scanning of the first plurality of actual touch locations includes interpolating at least two actual touch locations of the first plurality of actual touch locations.

26. The method of claim 15, further comprising:
detecting the user's interaction with the conductor pattern by evaluating respective characteristics of the first and second response signals.

27. A processor programmed to execute a process for detecting a user's interaction with a panel, the process comprising:
detecting first response signals produced by each of a plurality of first conductors of a conductor pattern to identify a first identified conductor of the plurality of first conductors, the plurality of first conductors being disposed in a first direction;
detecting second response signals produced by each of a plurality of second conductors of the conductor pattern to identify a second identified conductor of the plurality of second conductors, the plurality of second conductors being disposed in a second direction different from the first direction;

identifying an intersection between the first identified conductor and the second identified conductor as corresponding to a possible location of a user's interaction with the conductor pattern; and after identifying the possible location, receiving a select response signal from the second identified conductor produced in response to a select input signal applied to the first identified conductor to determine whether the possible location is an actual location of the user's interaction with the conductor pattern.

* * * * *